(12) United States Patent
Rinner

(10) Patent No.: US 9,644,783 B2
(45) Date of Patent: May 9, 2017

(54) PHONE CAMERA TABLET BIPOD SUPPORT SYSTEM

(71) Applicant: James A Rinner, Franksville, WI (US)

(72) Inventor: James A Rinner, Franksville, WI (US)

( * ) Notice: Subject to any disclaimer, the term of this patent is extended or adjusted under 35 U.S.C. 154(b) by 409 days.

(21) Appl. No.: 13/946,475

(22) Filed: Jul. 19, 2013

(65) Prior Publication Data

US 2014/0263939 A1 Sep. 18, 2014

Related U.S. Application Data

(60) Provisional application No. 61/802,454, filed on Mar. 16, 2013.

(51) Int. Cl.
 *F16M 13/00* (2006.01)
 *F16M 11/10* (2006.01)
 *F16M 11/38* (2006.01)

(52) U.S. Cl.
 CPC .......... *F16M 11/10* (2013.01); *F16M 11/105* (2013.01); *F16M 11/38* (2013.01); *F16M 13/00* (2013.01); *F16M 13/005* (2013.01)

(58) Field of Classification Search
 USPC ............... 248/447, 457, 458, 460, 461, 463; 361/679.3, 679.56
 See application file for complete search history.

(56) References Cited

U.S. PATENT DOCUMENTS

| | | | |
|---|---|---|---|
| 7,836,623 B2* | 11/2010 | Wang et al. | 40/747 |
| 8,162,283 B1* | 4/2012 | Royz et al. | 248/455 |
| 8,382,059 B2* | 2/2013 | Le Gette et al. | 248/460 |
| 8,456,834 B2* | 6/2013 | Zhu et al. | 361/679.56 |
| 8,520,371 B2* | 8/2013 | Peng et al. | 361/679.01 |
| 8,593,798 B2* | 11/2013 | Moon et al. | 361/679.22 |
| 8,607,976 B2* | 12/2013 | Wu et al. | 206/320 |
| 2007/0122141 A1* | 5/2007 | Agevik et al. | 396/419 |
| 2008/0006745 A1* | 1/2008 | Chong et al. | 248/166 |
| 2010/0207417 A1* | 8/2010 | Ito | B60N 2/3011 296/65.05 |
| 2015/0041622 A1* | 2/2015 | Mulhern et al. | 248/688 |

* cited by examiner

*Primary Examiner* — Alfred Wujciak
(74) *Attorney, Agent, or Firm* — Brainspark Associates, LLC

(57) ABSTRACT

The present invention is directed to a compact and pocketable camera support that attaches to an outer separate case or directly to the camera, tablet or phone body. This system uses one or more legs and/or other support features that fold away from the base of the invention and support the device whether it is a camera, phone or laptop/tablet computing device.

16 Claims, 27 Drawing Sheets

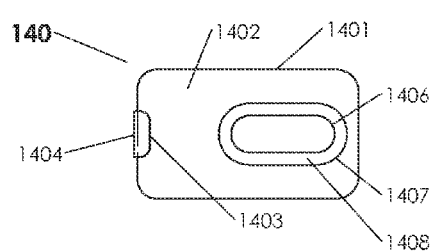
FIG. 32
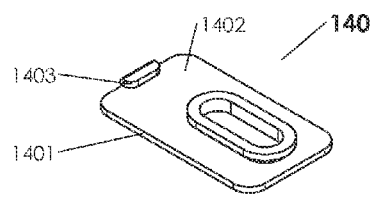
FIG. 33
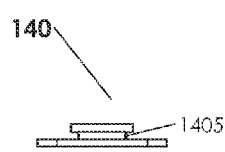
FIG. 34
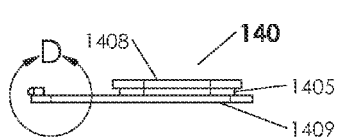
FIG. 35
FIG. 36
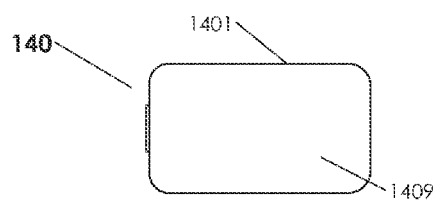
FIG. 37
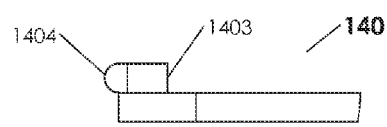
FIG. 38
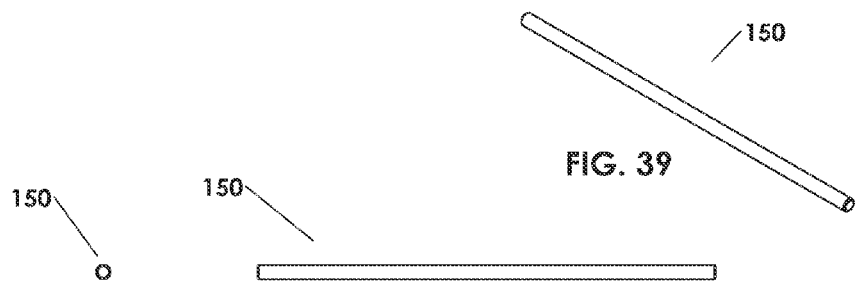
FIG. 39
FIG. 40
FIG. 41

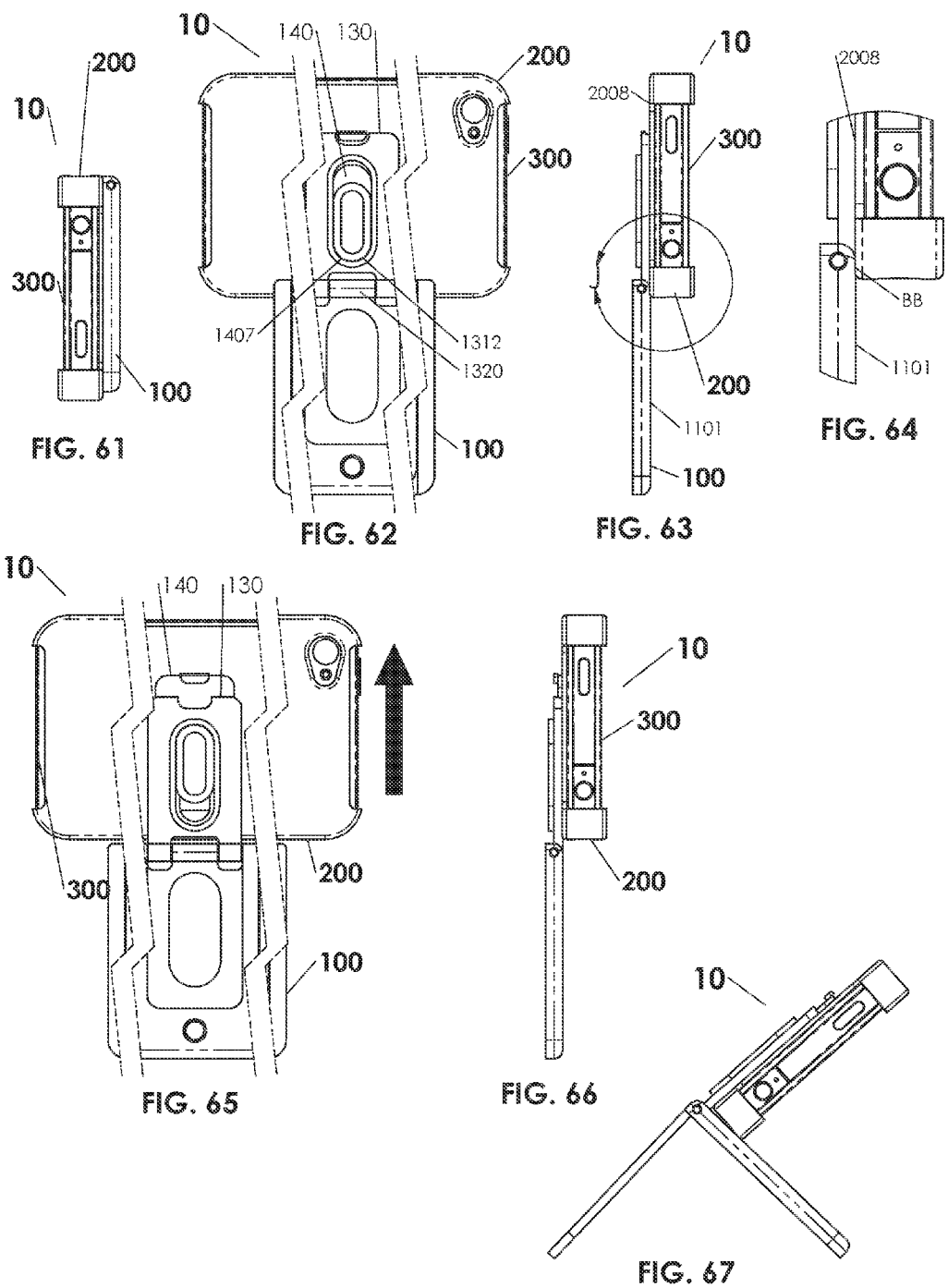

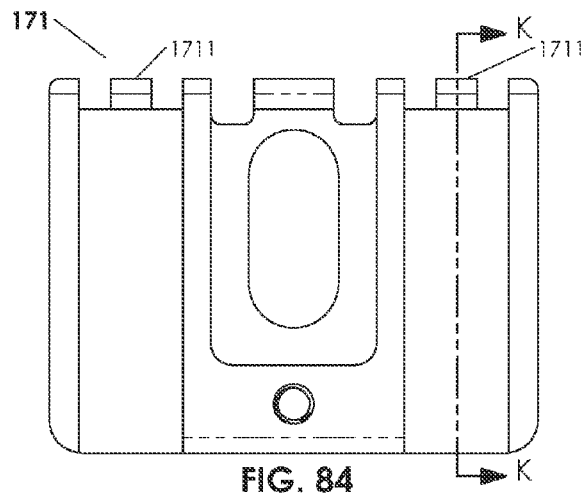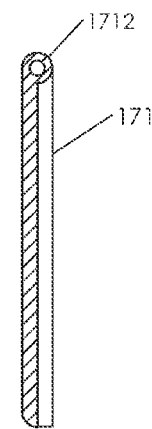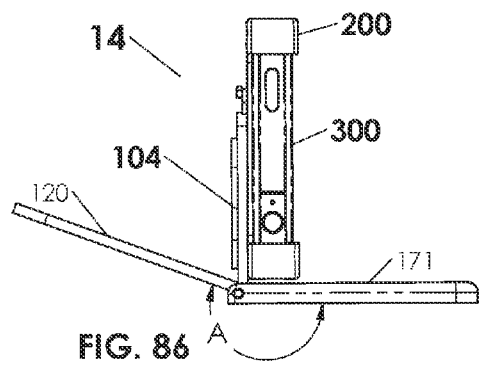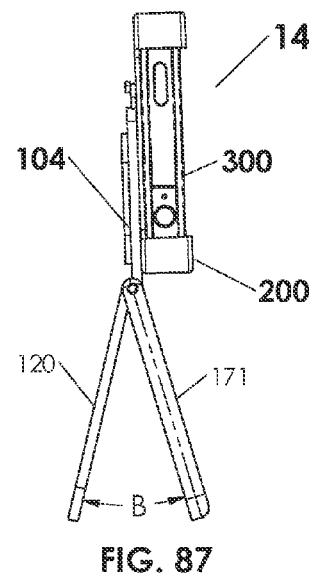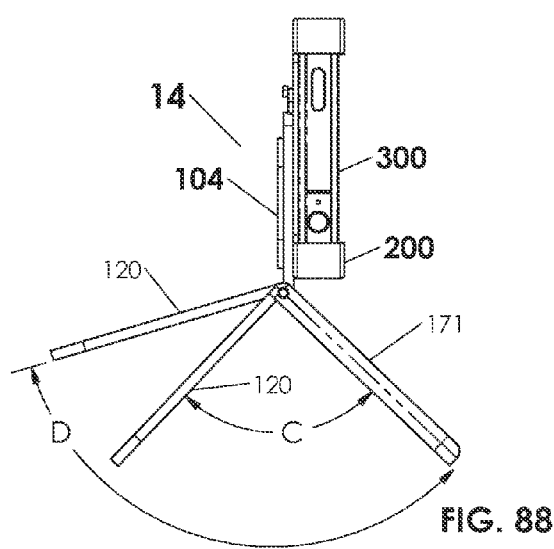

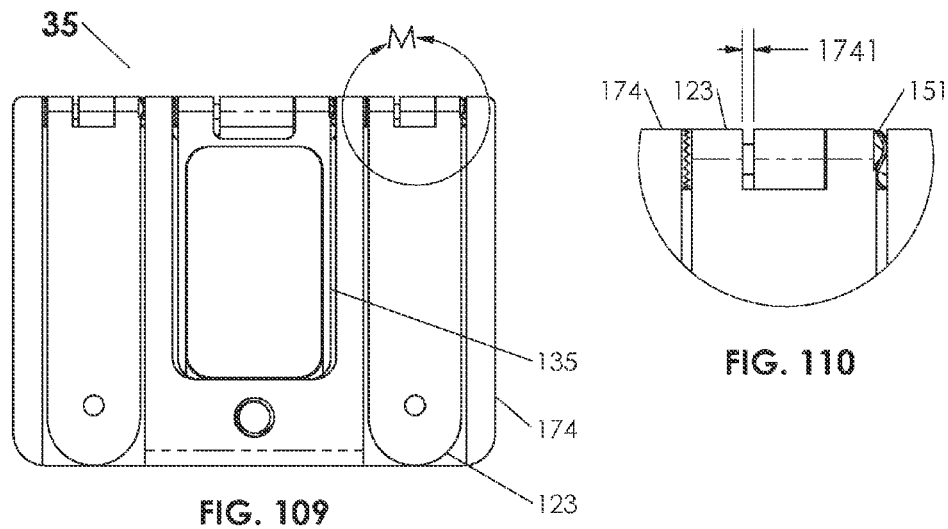
FIG. 109
FIG. 110
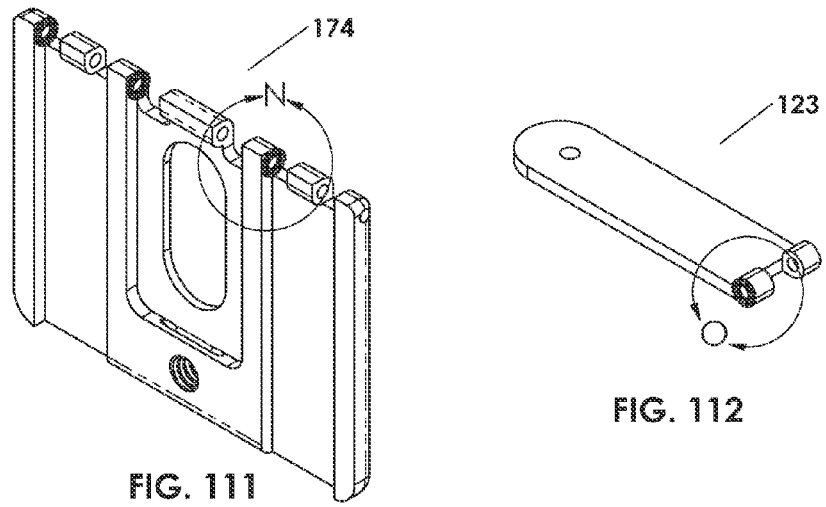
FIG. 111
FIG. 112
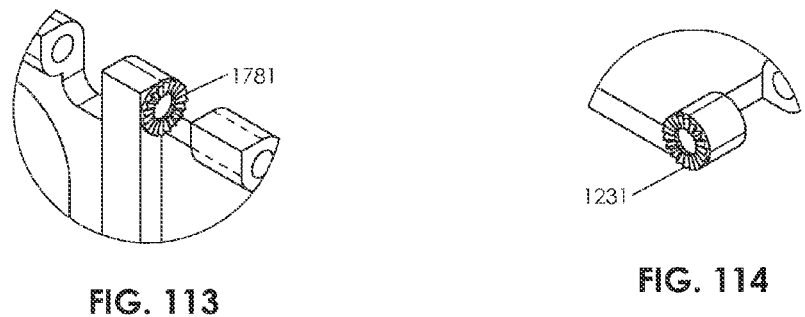
FIG. 113
FIG. 114

PHONE CAMERA TABLET BIPOD SUPPORT SYSTEM

CROSS-REFERENCE TO OTHER APPLICATIONS

This application claims the benefit of U.S. Provisional Patent Application Ser. No. 61/802,454 entitled "Phone Camera Tablet Bipod Support System," filed Mar. 16, 2013, the disclosure of which is incorporated herein by reference in its entirety.

TECHNICAL FIELD

This disclosure relates to an improved stand or support assembly to assist with the stabilization, rotation and/or positioning of a portable electronic device for a variety of reasons, including more convenient viewing, and/or photography/videography. More specifically, the present disclosure provides a variety of collapsible support structures that can be permanently attached to personal electronic devices (PED) and/or cases therefor to be positioned and/or stabilized on planar or non-planar surfaces, but when in a collapsed condition do not appreciably interfere with the use and/or transport of the PED.

BACKGROUND OF THE INVENTION

A variety of stands, tripods or other similar fixtures have been developed to hold personal electronic devices (PEDs) or other portable electronic devices, including cameras, phones or tablet devices, but these pre-existing designs are often cumbersome to assemble, inconvenient in size (i.e., too large to carry in a user's pocket), are not "solid" or durable, or the design does not provide sufficient stability when employed on planar and/or non-planar surfaces. Usually, such stands contain one or more pieces that must be assembled, and the assembled stand is then attached and/or detached to the device each time the device is used, and a separate carrying case for the stand is often required. For many reasons, currently available stands and other support devices are often left at home, or are stored in a compartment or location where the stand may not be easily and conveniently accessible to a user. Unless the user is a professional photographer or anticipates the specific needs for a stand or similar stabilization device, it is unusual for a user to carry a stand with them on a regular basis. More often, stands are stored for use, but this often results in the stand being unavailable for informal or "snap" photography/videography.

There has been an increased proliferation of personal/portable electronic devices that are "camera-enabled," which categories include devices such as digital cameras, mobile phones and portable computers (i.e., mini-computers, micro-computers, laptops and/or tablets). As technology continues to improve, upgraded and/or higher-resolution camera components are increasingly being integrated into consumer devices. Coupled with the increased popularity and easy availability of digital and web-publishing, camera-enabled devices have increasingly become sources for both casual and professional photography/videography. In virtually all instances, the stability and stabilization of a camera-enabled device can be a significant factor in the quality and usability of pictures and video taken with the device.

SUMMARY OF THE INVENTION

One aspect of the present invention includes the realization of a need for an improved collapsible stand or support assembly design that is that is slim and compact to easily fit into a user's pocket, and that does not significantly interfere with a user's operation of a PED that is permanently or semi-permanently attached thereto. In various embodiments, the support assembly can be attached directly to the PED or to a case therefore, and can be readily available for quick and easy assembly and/or deployment to facilitate the hands-free and/or stabilized use of the portable electronic device for use in digital photography/videography. In various alternative embodiments, the support assembly can support the device as desired by the user for convenient viewing of a display screen and/or stabilization of the device for a variety of additional uses. In one exemplary embodiment of the invention, the support assembly may include an assembly base having foldable or retractable legs that are "nested" or stored in a flush or semi-flush position relative to a surface of the electronic device, but that can be easily deployed for use on planar and/or non-planar surfaces. Desirably, when in a closed or nested condition the support assembly will not significantly increase the outer dimensions of the electronic device, and in various embodiments the support assembly is appropriately dimensioned to remain permanently or semi-permanently attached to the PED while allowing access to and/or use of the various device features. The closed support assembly will desirably not significantly interfere with carrying and storage of the PED, such as when the PED in inserted into pockets of a user's clothes or carrying in a user's purse or briefcase. In various embodiments, the support assembly can include rounded, beveled and/or smoothed surface features that may facilitate insertion and/or removal of the device from pockets or other tight storage spaces. Desirably, the exposed faces of the collapsed stand will have few or no outwardly projecting features or surfaces that could catch or "snag" on a user's clothing, or that would "poke" or otherwise irritate the user if pushed against their body. The assembly base may include features or cavities that allow the legs to be retracted, folded and/or nested into a slim, compact profile where the cavities correspond to size and/or shape of legs, plates and/or other components. If desired, the legs may be nested or the support assembly may include leg shapes that fold flat against the portable electronic device, with locking mechanisms incorporated into various surfaces, pivots or hinges of the support assembly.

In other exemplary embodiments, the improved stand or support assembly may include a PED case that can be removably connected to one or more types of PEDs, including mobile phones, various electronic cameras, video recorders, and/or computer tablets. The case may be designed and/or integrated with a support assembly base and/or the case may include a modular connection or component that can be removably connected to the support assembly. The case may include a variety of useful features for a consumer, such as access windows, removable protective covers, linear movement mechanisms, and/or rotation mechanisms. In various embodiments, the access window(s) can be desirably designed to allow a camera lens, light sensor and/or flash to be exposed to the surrounding environment, where the PED is a camera-enabled mobile phone or other PED type with photo capabilities. A rotation mechanism integrated into the case could allow the PED to be rotated easily to a landscape position, portrait position, and/or any angular position for specific viewing purposes. In addition, a sliding mechanism could be included in the support assembly base to allow axial movement of the PED in the X and/or Y axis. A support assembly could include a variety of multi-axis options to adjust the PED for precise viewing and/or stabilization of the PED and/or components therein. In various alternative embodiments, the case may be removable to allow a support assembly to be directly attached to a surface or component of the PED. In various embodiments, the moveable and/or adjustable components of the support assembly may provide protection to the PED when in the collapsed configuration, such as by covering and/or protecting the display screen and/or camera lens when in a non-deployed condition. In various alternative embodiments, the support assembly may connect directly to the PED and may provide additional features (i.e., a base or fixed plate of the support assembly may form part of a battery and/or replacement battery cover for the phone). In various additional embodiments, the support assembly may provide impact protection and/or water-resistance to the PED while in the nested or non-deployed condition.

In various embodiments, the stand or support assembly may include a base component having screw holes or other features, where the screw hole/other features can be used for a variety of additional functions based on the user's need. For example, the assembly base could incorporate a screw hole that is sized and configured to accept a standard tripod attachment screw, which would allow attachment of the stand to a standard tripod. This arrangement could be particularly useful where the PED does not already include a screw hole for stand attachment (i.e., for a laptop computer or mobile phone designs such as the iPhone), and could also be useful to provide an attachment hole in a more convenient location on the PED (i.e., for digital cameras having such an attachment hole on the camera base, it may be useful for the standard tripod to attach in a different location). The attachment of the assembly base with a case (and PED) to another standard tripod allows the consumer improved flexibility to freely adjust their PED to an increased variety of multi-axial positions and/or height adjustability as compared to using a standard tripod attached to the PED directly. In addition, the screw hole or other feature on the stand may be used to attach a suction cup or other device. The suction cup may be used to adhere to any acceptable non-porous surface by creating some partial or complete vacuum, in a known manner. This allows the device to temporarily affix the assembly base and the PED to non-porous vertical surfaces, such as tiled walls, windshield windows, refrigerator doors, and any other acceptable surface. Similar arrangements could be used for attachment to porous or other surfaces using hook and loop fasteners such as Velcro, etc. Furthermore, the screw hole or other feature could accommodate thread, string or wire through the hole to hang, tie and/or wrap the assembly base with the case to any specific object. In various embodiments, the screw hole and/or related features could also be used to attach the support assembly directly to the PED, if desired.

In various embodiments, the components of the support assembly share a common or co-linear end-point or pivot point, which allows the assembly to be quickly and inexpensively manufactured and assembled while providing for a wide, stable platform and excellent support and stability for the attached PED.

In various embodiments the stand or support assembly may be manufactured in a slim and/or compact size to reduce the overall profile. Desirably, the stand will facilitate storage in a collapsed profile without interfering with the operation of the PED, while allowing for significant support and/or "spherical" adjustment of the PED with the stand deployed. In various embodiments, the legs and/or base components are substantially flat, which allows them to be collapsed into a very compact volume against the PED surface. When collapsed, the various components desirably overlap or "nest" into each other In various exemplary embodiments, the stand or support assembly may be used alone or in conjunction with other standard equipment.

In various embodiments, the improved stand or support assembly may be manufactured from a variety of materials. The improved stand or support fixture may be manufactured using plastic, carbon fiber, metal, wood, and/or any combination thereof.

These and other objects, advantages, and features of the disclosure will be apparent from the following description, considered along with the accompanying drawings.

BRIEF DESCRIPTION OF THE DRAWINGS

The present invention will be more understood in the detailed description and the accompanying drawings.

FIGS. 32-37 depict various views of one embodiment of a fixed plate;

FIG. 38 depicts an enlarged view of area "D" of FIG. 35;

FIGS. 39-41 depict various views of one embodiment of a hinge pin;

FIG. 61 depicts a side view of a support assembly in the closed or nested configuration, with the assembly attached to a mobile phone case and mobile phone;

FIG. 62 depicts a partial back-side view of the support assembly, case and mobile phone of FIG. 61, with the support assembly in a partially-deployed orientation and the sliding plate in a non-deployed position;

FIG. 63 depicts a side view of the support assembly, case and mobile phone of FIG. 62;

FIG. 64 depicts an enlarged partial view of area "J" of FIG. 63;

FIG. 65 depicts the partial back-side view of the support assembly, case and mobile phone of FIG. 61, with the sliding plate of the support assembly in a deployed position;

FIG. 66 depicts a side view of the support assembly, case and mobile phone of FIG. 65;

FIG. 67 depicts a side view of the support assembly, case and mobile phone of FIG. 65 with the legs of the support assembly in a fully deployed condition and showing forward rotation of the PED and case;

FIG. 84 depicts a back-side plane view of an alternative embodiment of a base for a support assembly, the base allowing for unrestricted rotation of various assembly components;

FIG. 85 depicts a cross-sectional view of the base of FIG. 84, taken along line K-K;

FIGS. 86-88 depict various views of the support assembly, case and PED of FIG. 85, with the base and leg components deployed to a variety of support angles;

FIG. 109 depicts a back-side plan view of another alternative embodiment of a support assembly having a positive locking or detent mechanism and radial toothed assembly for regulating rotation of the various assembly components from nested to deployed configurations;

FIG. 110 depicts a partial enlarged view of the area "M" of FIG. 109;

FIG. 111 depicts a perspective view of a base component of the support assembly of FIG. 109;

FIG. 112 depicts a perspective view of a leg component of the support assembly of FIG. 109;

FIG. 113 depicts a partial enlarged views of the area "N" of FIG. 111;

FIG. 114 depicts a partial enlarged views of the area "O" of FIG. 112;

DETAILED DESCRIPTION OF THE DRAWINGS

Figure 1:
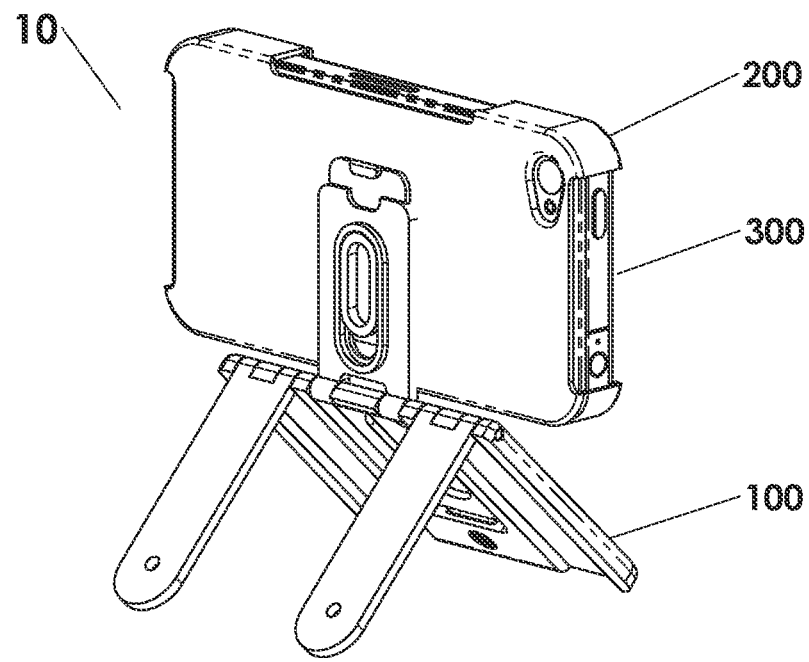
FIG. 1 depicts a rear perspective view of the improved stand or support assembly in an open or deployed configuration, with an attached case including a mobile phone.

In the following detailed description, for purposes of explanation, numerous specific details are set forth to provide a thorough understanding of the various embodiments of the disclosure. Those of ordinary skill in the art will realize that these various embodiments are illustrative only and are not intended to be limiting in any way. In addition, for clarity purposes, not all of the routine features of the embodiments described herein may be shown or described for every alternative embodiment. One of ordinary skill in the art would readily appreciate that in the development of any such actual implementation, numerous implementation-specific decisions may be required to achieve specific design objectives. These design objectives may vary from one implementation to another and from one developer to another, and the variations thereof are contemplated and included in the present disclosure.

Function

The various embodiments of the disclosure provide for a stand or support fixture assembly that can be customized for use with a variety of portable electronic devices ("PEDs") for more convenient transport, viewing, stabilization and/or orientation flexibility. Such PEDs may include mobile phones, video recorders, cameras, computers such as laptops and/or tablets, and any combinations thereof. The footprint of the support assembly is very important for the stability and/or support of the PED. Stability is enhanced where the vector defining the earth's pull on the object (i.e., the gravitational attraction force, corresponding to the weight of an object), when acting through the center of gravity of the object, should generally be within a triangle, square or other geometric representation formed by the legs and other components of the support assembly. Where the vector approaches the edges of the triangle (or other representation), the system may have a tendency to tip towards that direction, and thus such situations will be desirably avoided with the various designs and embodiments described herein.

The ease and convenience of transporting a stand or other type of integrated support fixture or assembly in combination with a PED can be facilitated by a slim, compact design. In various embodiments, the components of the stand or support fixture will desirably include one or more attachment features for connecting the stand to the PED, a body or base feature, and one or more deployable support arms/legs that are capable of transitioning from a collapsed configuration to a deployed configuration. In various embodiment, the base many include recessed cavities or other features that allow the legs to be retracted within the cavities or nested within the cavities when folding the stand or support assembly 100 closed, such as the embodiment shown in FIG. 3. Such designs desirably allow the overall thickness profile of the stand or support assembly to be minimized and allow easy storage and transport in a consumer's pocket, purse, briefcase, glove compartment, and/or any combination thereof. The design also desirably allows full use of the PED with minimal interference when in the collapsed configuration. In various embodiments, the slim compact design of the stand can be maintained even when it is not attached to a phone (see FIG. 3) and/or when it is attached to a phone (see FIG. 2).

Components

In various exemplary embodiments the stand or support fixture assembly may include a base assembly with one or more deployable arms/legs, a portable electronic device (PED) case, and a PED. FIG. 1 is a rear isometric view of one embodiment of a stand or support assembly 10 with a base component 100 in an open or deployed configuration attached to a mobile phone case 200 having a camera mobile phone 300 secured within the case 200. The stand or support assembly 10 in this open or deployed configuration is positioned in one of many possible positions and orientations/representations into which the stand or support assembly 10 can be manipulated.

Figure 2:
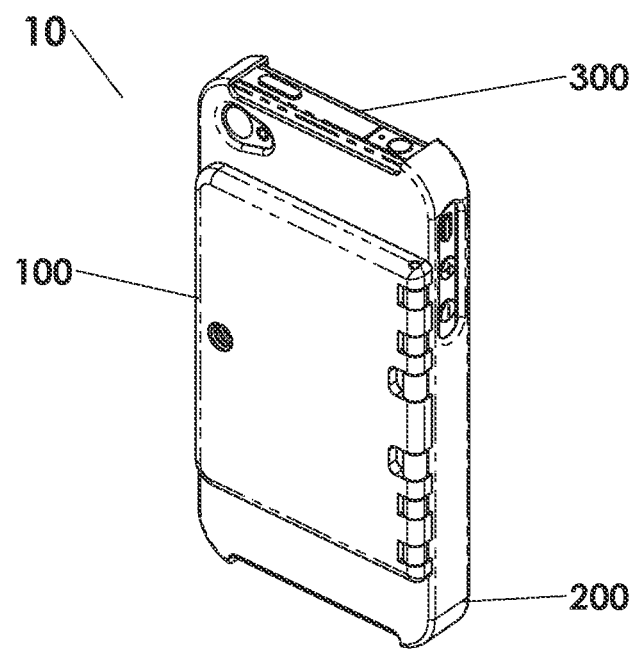
FIG. 2 depicts a perspective view of the embodiment of FIG. 1 with the support assembly in a closed, retracted or "nested" configuration.

The stand or support assembly 10 is versatile, and may be folded into a slim, compact profile as shown in FIG. 2, which is a rear perspective view of the stand or support assembly 10 with the base assembly 100 in the closed or retracted configuration. The assembly 100 is attached to a mobile phone case 200, with a camera-enabled mobile phone 300 positioned within the case 200. In various embodiments, the base assembly can desirably be sized to match or substantially match one or more of the width and/or length of the mobile phone and/or the mobile phone case, with the collapsed assembly desirably not extending beyond the edges of the case. Sizing the base assembly 100 to match or substantially match the dimensions of the mobile phone and/or the PED case can facilitate a consumer's storing of the entire construction easily in a variety of locations, such in a pocket, a purse, a wallet, a briefcase, a glove compartment, car sun visors, front seat center console and/or in an organizer. Furthermore, the base component 100 may be also be desirably sized to a slim profile to fit, engage, interact or integrate with any other consumer mobile phone cases, such as consumer purchased leather cases, hanging pouches, slide-in pouches, sandwich carrying cases, leather cell phone holsters, exercise armbands, belt mounted cases, clip case, Otterboxes (commercially available from Otter Products, LLC of Fort Collins, Colo., USA) and/or various combinations thereof. Various design features can be incorporated into the assembly to fit or integrate the support assembly with a variety of commercially available mobile phone or other PED cases, and in various embodiments a single support assembly design can be integrated with a variety of such products, so as to obviate the need for a consumer to purchase a replacement case or modified case to accommodate a newly-purchased and/or already purchased support assembly.

Desirably, the overall dimensions and/or thickness or width of the base (as well as the remaining components of the support assembly) can be customized or particularized to an individual or class of specific portable electronic devices (PEDs) intended to be supported, which could include virtually any device currently available on the market including, for example, cellular or mobile phones (i.e., Samsung phones, iPhones and/or Blackberry phones), compact cameras, video recorders, laptops and/or tablet computers, etc. Alternatively, the base and other components may be sized and configured according to standard sizes that reflect the average dimensions of a given PED or class of PEDs, and these sizes may include small, medium, large, or x-large base sizes. In general, the width/height of the support assembly in the collapsed configuration should generally not exceed the width/height of the PED and/or case it supports, although various other ratios, such as less than twice the width/height of the PED/case, less than half the width/height of the PED/case, less than one quarter of the width/height of the PED/case and/or less than one fifth of the width/height of the PED/case may be desired.

In various alternative embodiments, a user may wish to detach a PED (such as a camera mobile phone 300) or PED case 200 from the base assembly 100. This may be due to a desire to significantly reduce the overall profile of the PED/support assembly or the PED/case/support assembly combination, for situations where the need or desire for an attached stand is reduced and/or eliminated, or where it is desirous to transfer the stand to another device. In various embodiments, the support assembly may include a detachable linkage to the PED, while in other embodiments the support assembly may be permanently and/or semi-permanently directly mounted to the PED and/or to a PED case.

Figure 3:
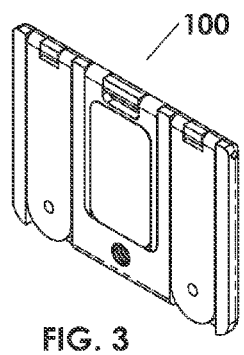
FIG. 3 depicts a perspective view of the support assembly of FIG. 2 in a closed configuration, without an attached case.

FIG. 3 depicts a perspective view of a collapsed or closed support assembly 100, with the support assembly separated from a PED or PED/case. FIGS. 5 through 10 depict various plan views of the support assembly 100 of FIG. 3, showing the slim, compact profile attainable in the collapsed, closed or "nested" profile.

Figure 4:
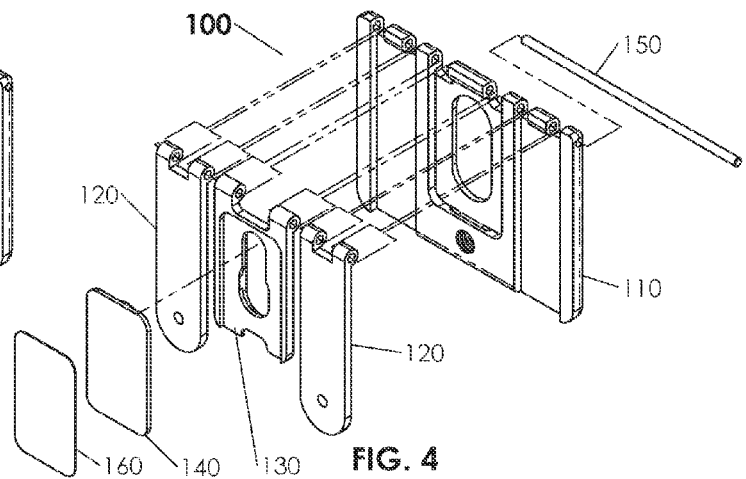
FIG. 4 depicts an exploded view of the support assembly of FIG. 3.
Figure 5:
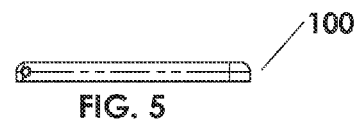
FIGS. 5-10 depict planar views of the support assembly of FIG. 3 from various orientations.
Figure 6:
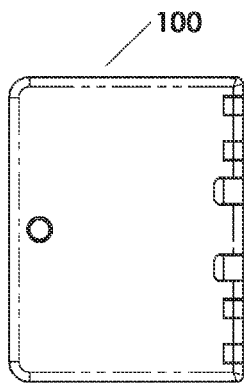
Figure 7:
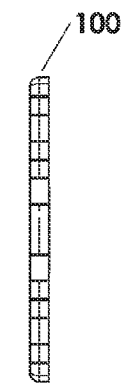
Figure 8:
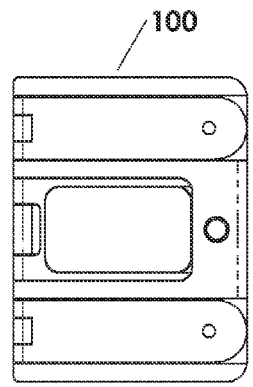
Figure 9:
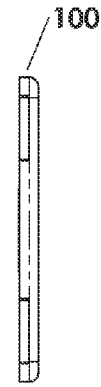
Figure 10:

FIG. 4 depicts an exploded perspective view of the support assembly 100 of FIGS. 1 through 3. The support assembly 100 includes a base 110, a hinge pin 150, a pair of support legs 120, a sliding or slider plate 130, a fixation or fixed plate 140 and a double-sided adhesive pad or suitable adhesion material 160.

The base 110 in this embodiment can desirably serve a variety of functions at the user's option, including as an individual support structure for supporting the PED. In alternative configurations, the base 110 can be deployed in combination with one or more deployed support legs 120 to support the PED/case in a bipod and/or tripod fashion. As will be described later, the base 10 also desirably includes recessed portions that can accommodate and contain the various other components of the assembly, which allows the collapsed assembly 100 to assume a low-profile shape and be folded flat against the PED or PED case (as shown in FIG. 2).

FIGS. 14 through 21 depict various plan views of the base component 110 of the support assembly 100 of FIG. 4. The base 110 includes an outer face 1101 and an inner face 1105. In the disclosed embodiment, the base is desirably formed in a flat, planar shape which substantially matches or approximates the shape of a surface of the case and/or surface of the PED against which the assembly 100 is secured and/or collapsed (although alternative shapes and curvatures could be used, at the designer's option and/or depending upon the relevant surface contours of the PED). The base 110 can include a series of thicker sections 1103 which can be separated by cavities or recessed sections 1102 and 1104. The recessed sections are desirably sized and configured to accommodate a substantial portion of the support legs 120, the sliding plate 130 and/or the fixation plate 140 therein (see FIG. 4) when the assembly is in a collapsed and/or partially-collapsed configuration. A periphery 1115 of the outer face can be curved, smoothed or radiused, if desired.

In various embodiments, the components of the support assembly 100 will be designed to facilitate collapsing and/or storing of the stand or assembly in a thin, unobtrusive fashion. For example, the base 110 can incorporate a variety of features such as thickened ribs that strengthen the base, while maintaining a minimal thickness and presenting a smooth, relatively unbroken external profile when the stand is in a collapsed condition. Such an arrangement will desirably allow the stand to remain permanently attached to the PED (and unnoticed) during normal daily use, with the stand deployed when necessary to accommodate the user's needs. For example, thicker plate sections 1103 and 1105 can function as strengthening ribs for the base 110, providing additional strength and rigidity to the base 110 without significantly increasing the overall dimensional thickness of the base 110 or the overall assembly 100.

Figures 15, 16:
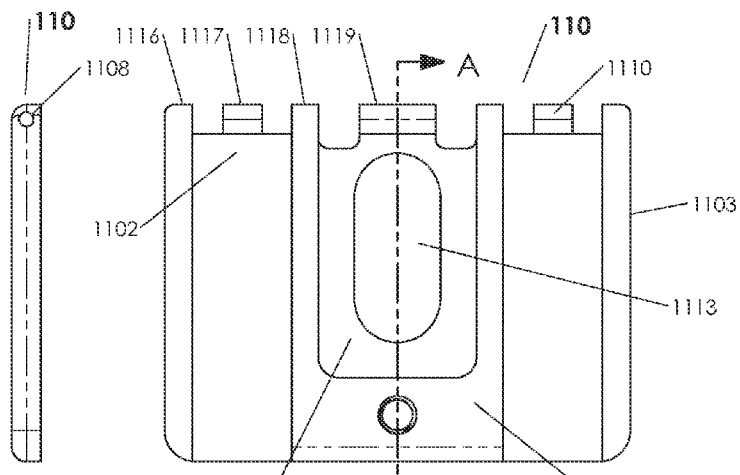
FIG. 15 depicts a left side view of the base of FIG. 14.
FIG. 16 depicts a back side view of the base of FIG. 14.

FIG. 16 depicts a rear plan view of the inner face of the base 110 showing a pair of leg cavities 1102 and a centrally-positioned sliding plate cavity 1104, with the remaining inner face 1105 of the base 110 surrounding the aforementioned cavities. This arrangement desirably allows each leg 120 to be completely folded into an appropriate leg cavity 1102, and similarly accommodates the sliding plate 130 within the sliding plate cavity 1104 when the assembly is in a collapsed condition. For example, the leg cavities 1102 may be designed with a volume (length, width, and/or depth) that may match or substantially match the leg design, and/or the leg cavities 1102 may be designed for standard dimensions. Such designs could allow the legs 120 to fold or retract into the leg cavity 1102, where the legs 120 do not protrude substantially from the planar surface 1105 that surrounds the cavities. In various designs, the legs 120 may completely or partially fold or retract into the leg cavity 1102. Complete nesting of legs into the cavity will desirably maintain an equal or substantially equal planar surface from the surface 1105 that surrounds the cavity (see also FIG. 20) and onto the surface of the legs 120. The design will desirably include at least one leg cavity 1102, but may include a plurality of leg cavities 1102 to accommodate the number of legs 120 that can be attached to a base assembly 110. The design of the base may also optionally include leg stop surfaces 1110 to provide the legs 120 a positive stop that limits leg rotation to a desired degree when a leg is rotated out of the cavity 1102, or can limit or control leg rotation when retracting, folding or sliding the leg into the cavity. Once the legs are nested to the base, they are desirably enclosed within the protective cavity. Such protection can desirably prevent and/or inhibit the consumer from inadvertently deploying the legs and/or damaging the legs 120, base and/or hinge structures inadvertently.

While the legs 120 are depicted in a substantially parallel arrangement in the disclosed embodiment, in various alternative embodiments the one or more legs 120 could be positioned and/or arranged in a non-parallel fashion, such that they splay or extend outward of each other and/or the base 110.

The base 110 may also incorporate at least one slider hinge cavity 1104 and slider plate opening 1113. The slider hinge cavity 1104 may be designed to match or substantially match the dimensions of the slider plate 135 and associated connection components. The design of the cavity 1104 can include a volume and configuration (i.e., length, width, and/or depth) that may match or substantially match the dimensions of the slider or other mechanism. The slider hinge cavity 1104 may be designed to allow the multi-axial sliding, such as X-axis sliding, Y-axis sliding, angled sliding, and/or any combination thereof. In addition, the length of the slider hinge cavity 1104 and/or slider plate opening 1113 may be configured and arranged to allow or set a predetermined sliding distance for the base.

The base also includes a plurality of tabs 1116, 1117, 1118 and 1119 extending from a proximal side of the base 110. Each of the tabs 1116, 1117, 1118 and 1119 desirably includes a bore 1108 (see FIG. 15) extending there through, with the bore sized to accommodate a hinge pin 150 (see FIG. 39). Each tab 1116, 1117 and 1118 is formed by a similar surface 1106 between points "a" and "b" for the legs 102 and tabs 1119 formed by surfaces 1107 between points "c" and "d" for the sliding plate 130.

Figure 27:
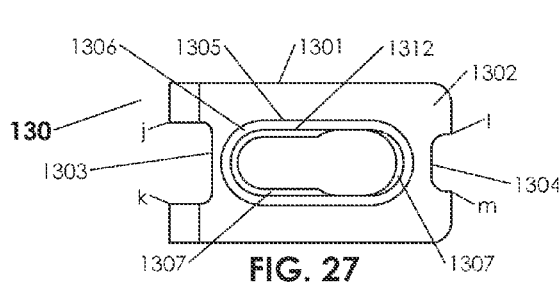
FIGS. 27-31 depict various views of one embodiment of a sliding plate.

The slider plate opening 1113 is desirably sized and configured to accept a raised ridge 1306 of the sliding plate 130 (see FIG. 27) when the assembly is in a collapsed and/or partially-collapsed configuration.

The support assembly 100 can be designed with one or more legs 120 having a variety of configurations. FIGS. 22 through 26 depict various views of one embodiment of a leg 120. In this embodiment, each leg 120 is formed in a longitudinally extending configuration (i.e., long, thin and flat). For example, the leg 120 can be designed with flat surfaces and have a thin wall thickness. The leg may include relatively flat planar surfaces 1202 may be on the front 1202 (see FIG. 24), the back 1207 (FIG. 26), and/or the sides 1206 (see FIG. 25), although curved or smoothed surfaces may be utilized as well. The thickness of the wall 1201 of the leg (see FIGS. 22 and 23) may be desirably thin in the disclosed embodiment, so as to approximate the depth of the cavity or recessed sections 1102 of the base 110, thus desirably allowing the leg to fold or retract substantially into the cavity 1102. The leg 1202 further includes leg hinge tabs 1204, with each hinge tab 1204 including a bore 1208 extending there through, the bore being sized to accommodate a hinge pin 150 (see FIG. 39). The tabs may each have a width "g"-"e" and "f"-"h" and radial surfaces 1205 which allows free rotational movement. Each leg may also optionally include a through-hole 1203 near a distal end of the leg.

Figure 28:
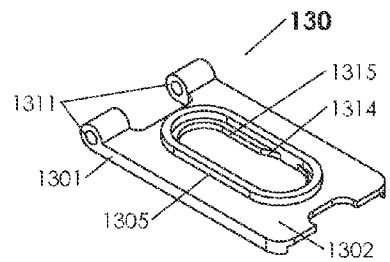
Figure 29:
Figure 30:
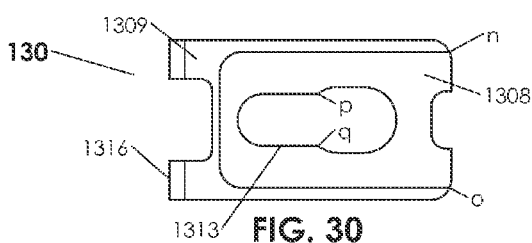
Figure 31:
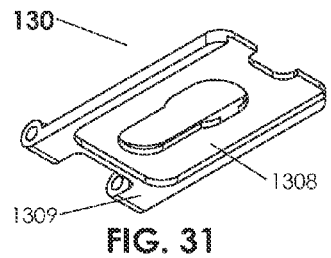

FIGS. 27 through 31 depict various views of an exemplary sliding plate 130. The sliding plate 130 includes a sliding plate body 1301 having a sliding face 1308, inner face 1309 and an outer face 1302. A centrally-located opening 1313 can be formed in the plate body 1301, the opening 1313 sized and configured to accommodate a corresponding sliding tab 1408 of the fixation plate 140. The opening 1313 desirably includes a large bore section 1314 and a reduced bore section 1315, and in the disclosed embodiment a raised ridge 1306 surrounds the opening 1313. A lip 1307, which substantially surrounds the reduced bore section 1315 as well as a portion of the larger bore section 1314, includes lip edges "p" and "q." As best seen in FIGS. 28 through 30, the plate 130 further includes hinge portions 1316, each of which includes radial surfaces 1310 which desirably allow free rotational movement and a central bore 1311 for accommodating a hinge pin 150 (see FIGS. 39 and 40). The plate may also include a hinge notch 1303 between edges "j" and "k" and a tab notch 1304 between edges "l" and "m". In the disclosed embodiment, the sliding face can include a recessed portion 1308, with this recessed portion 1308 desirably sized and configured to accommodate the fixation plate 140 therein (with a width of the recessed section being sized between points "n" and "o" to accommodate a corresponding fixation plate).

FIGS. 32 through 38 depict various views of an exemplary fixation plate 140. The fixation plate 140 includes a fixation plate body 1401 having a fixation face 1409 and a sliding face 1402. A stopping or locking tab 1404 having a tab face 1403 extends from the sliding face 1402. A sliding tab 1408 also extends out of the sliding face 1402, the sliding tab 1408 including a sliding groove 1405 located between a tab face 1407 and the sliding face 1402. In the exemplary embodiment, the inner bore 1406 of the sliding tab 1408 is hollow, although a solid construction can be contemplated in alternative embodiments.

FIGS. 39 through 41 depict one embodiment of a hinge pin 150 for use with the various components of a stand or assembly 100 as previously described. The hinge pin 150 is desirably sized to fit within the various hinge openings 1108, 1208 and 1311 of the component pieces of the support assembly 100 when fully assembled for use and can be configured to have a slip or friction fit.

Assembling the Components

The present embodiment particularly facilitates assembly of the various components of the support assembly 100, which can be best seen in the exploded view of FIG. 4. The base 110, legs 120 and sliding plate 130 are desirably assembled together, with the tabs 1116, 1117, 1118 and 1119 of the base 110 interlocking in a known manner with the leg tabs 1204 and sliding plate hinge tabs 1316. Desirably, each of the hinge openings 1108, 1208 and 1311 are aligned, so as to allow the hinge pin 150 to be inserted through all of the openings in a single operation, thereby securing the base 110, the legs 120 and the sliding plate 130 together in one step. In another assembly step, the fixed plate 140 can be assembled to the sliding plate 130 by inserting the sliding tab 1408 of the fixed plate 140 into the corresponding large bore section 1314 of the sliding plate opening 1313, and then sliding the fixed plate 140 towards and along the sliding plate to "snap fit" the fixed and sliding plates together. This assembly operation positions the lip 1307 of the sliding plate 130 within the sliding groove 1405 of the fixation plate 140, desirably securing the fixation plate 140 and sliding plate 130 together, yet allowing limited sliding and/or rotational motion between the two plates 130 and 140. The sliding tab 1408 can also be a separate ring from the sliding plate 140 which is then bonded, glued or welded into position.

Figure 11:
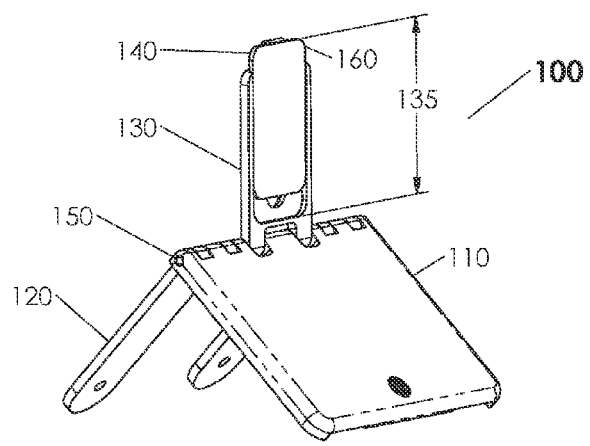
FIGS. 11-13 depict front, back and bottom perspective views of the support assembly FIG. 1, without an attached case.
Figure 12:
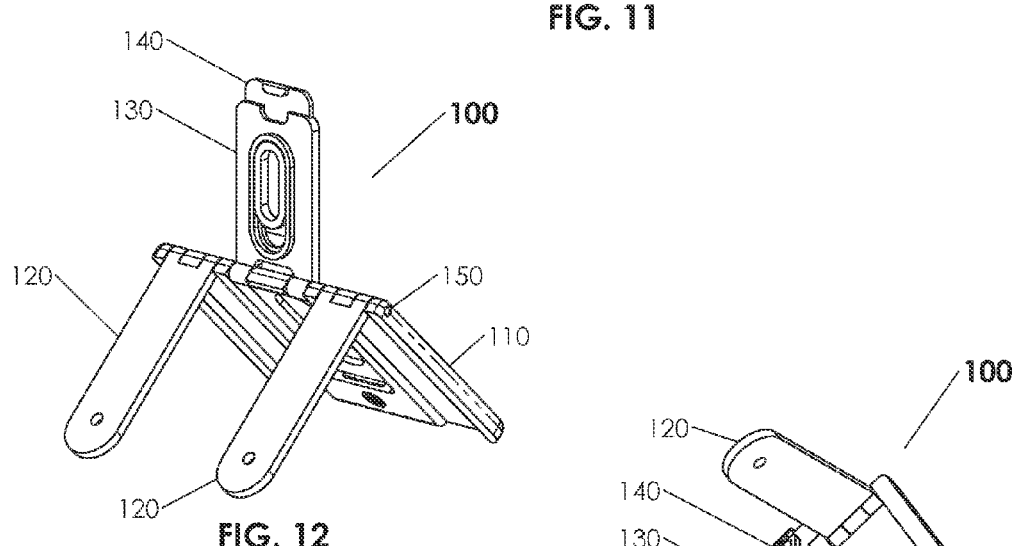
Figure 13:
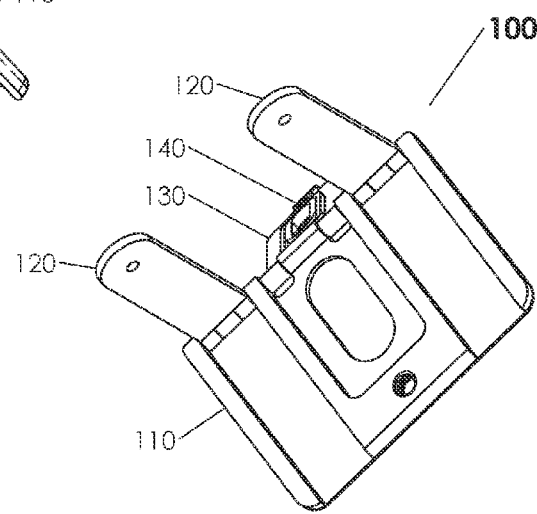
Figure 14:
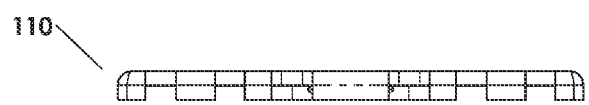
FIG. 14 depicts a top plan view of one embodiment of a base component for a support assembly.

Once the stand or assembly 100 has been completely assembled in this fashion, best shown in FIGS. 11 through 13, the support assembly 100 can be attached to a surface of the PED using an adhesive pad 160 or other adhering or fixation means. Alternatively, the assembly 100 can be attached to a case, component or other intermediary between the assembly 100 and the PED, as desired by the user. In various alternative assembly embodiments, the fixed plate may be attached to the PED and/or PED case prior to attachment to the sliding plate, if desired.

Exemplary Uses

Figure 42:
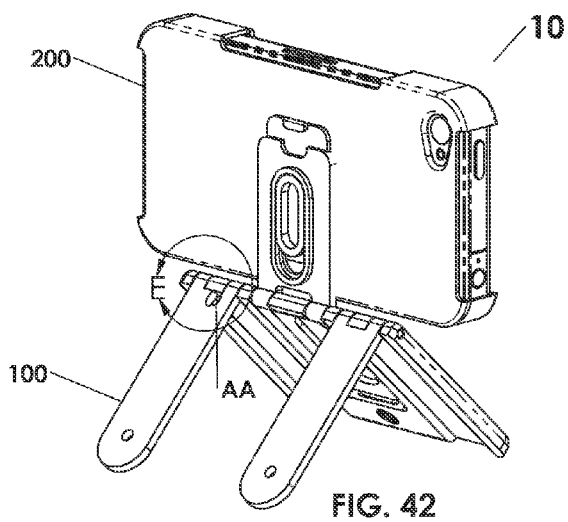
FIG. 42 depicts a perspective view of the support assembly and case of FIG. 1, attached to a mobile phone in an open or deployed configuration and highlighting a leg to base assembly.

FIG. 42 depicts one exemplary embodiment of a case 200 for use with a PED such as an iPhone 4 or 4s (commercially available from Apple Corporation of Cupertino, Calif., USA). The case 200 includes a case body 2001 that approximates the size and shape of a portion of the outer surface of an iPhone, with a series of overlapping edges 2005 extending outward from various locations on the perimeter of the case body 2001. The edges 2005 include edge walls 2006 that can terminate at a curved tip 2011, with the edges substantially surrounding corresponding outer edges of the iPhone 300 (see also FIGS. 51 through 56) when the case is assembled to the iPhone body. The edge walls 2006 and curved tips 2011 desirably envelop and secure the iPhone in a known manner, with the edges desirably flexing to allow the iPhone to be inserted into the case, and then "snapping back" to envelop the iPhone in a known manner.

The case 200 further includes various features that permit access to and/or allow functionality of various iPhone components. For example, the case 200 includes top and bottom openings 2003, with the top opening positioned to allow access to the top 3005 of the iPhone, including access to the power button and headphone jack of the phone. Similarly, the bottom opening 2003 allows the bottom 3006 of the phone to be exposed by the case, facilitating access to an input port as well exposing the left and right speakers of the phone. The case also includes a left side opening 2007 that provides access to the side surface 3003 of the iPhone, permitting access to a speaker activation switch and volume control buttons. In addition, the case body 2001 desirably includes one or more through openings 2002 positioned to expose a rear camera lens 3007 and a flash/led light-source 3008 on the back surface 3001 of the camera to the outside environment.

Figures 57, 60:
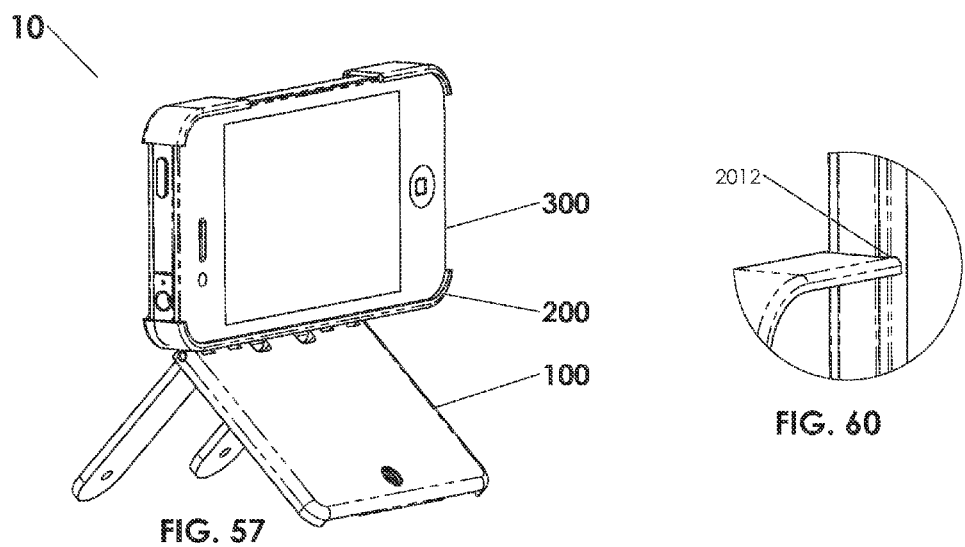
FIG. 57 depicts a perspective view of a support assembly and case attached to a mobile phone, with support assembly opened or deployed and the phone in a landscape orientation.
FIG. 60 depicts an enlarged partial view of area I of FIG. 59.

FIGS. 42 and 57 depict an iPhone 300 enclosed and protected by the case 200 in a standard orientation. While this embodiment depicts a case designed to accommodate and protect a model 4 or 4S iPhone (an exemplary embodiment of which is depicted in FIGS. 51 through 56), similar case designs could be utilized for other phones and/or phone models (from Apple Corp as well as other manufacturers), with alternative case designs desirably accounting for variations in phone shape, size and component positioning.

Figure 44:
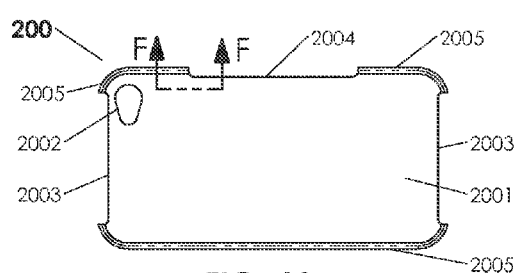
FIGS. 44-46 depicts various views of one embodiment of a PED case designed for use with a mobile phone.
Figure 45:
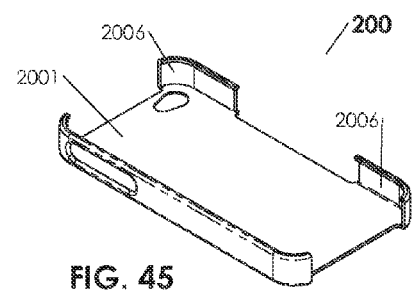
Figure 46:
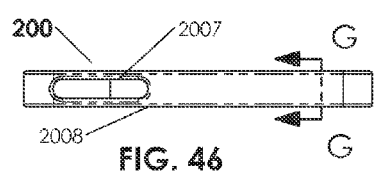
Figure 47:
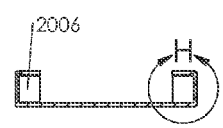
FIG. 47 depicts a cross-sectional view of the case of FIG. 46, taken along line G-G.
Figure 48:
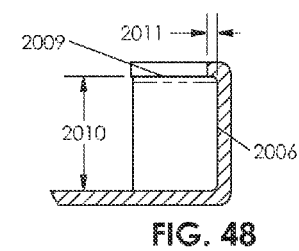
FIG. 48 depicts a partial enlarged view of area "H" of FIG. 47.
Figure 49:
FIG. 49 depicts a bottom plan view of the case of FIG. 44.
Figure 50:
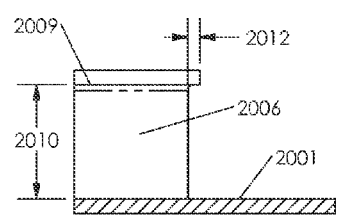
FIG. 50 depicts an enlarged partial side view of the case of FIG. 44, taken along line F-F.
Figure 51:
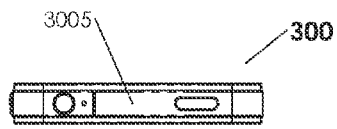
FIGS. 51-56 depict various views of one embodiment of a mobile phone that may be used with the various support assembly embodiments described herein.
Figures 52, 53, 54, 55:
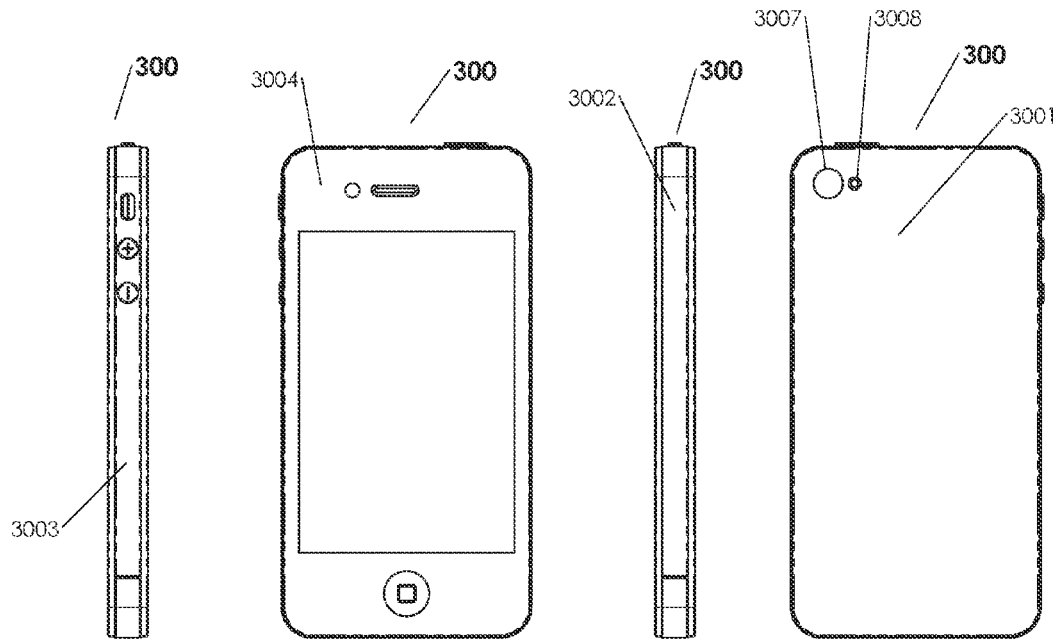
Figure 56:
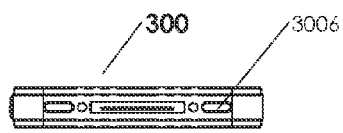
Figures 58, 59:
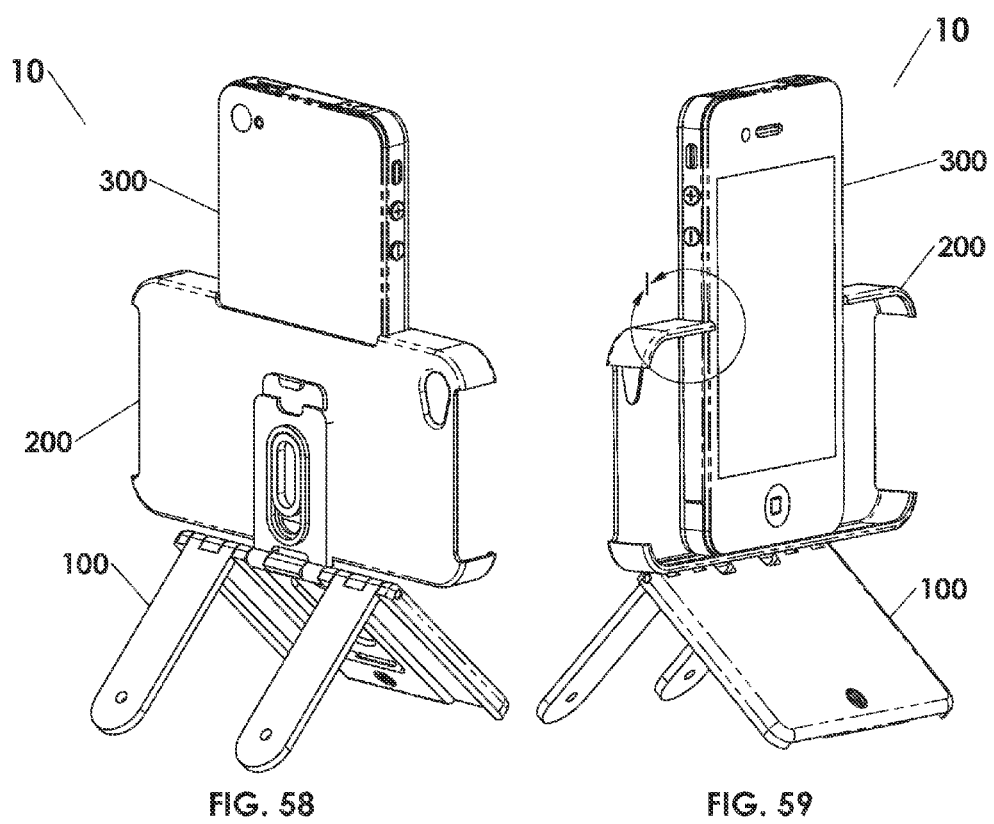
FIGS. 58 and 59 depict front and back perspective views of the support assembly of FIG. 57 in an open or deployed configuration, with the mobile phone attached to the case and support assembly in portrait orientation.
Figure 68:
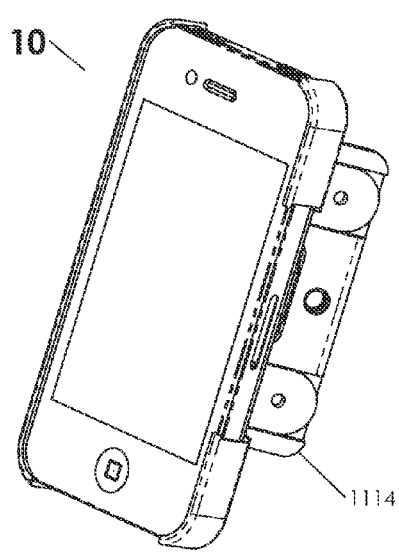
FIGS. 68 and 69 depict bottom and side perspective views of the support assembly, case and PED, with the base of the support assembly supporting the PED in a partially open configuration.
Figure 69:
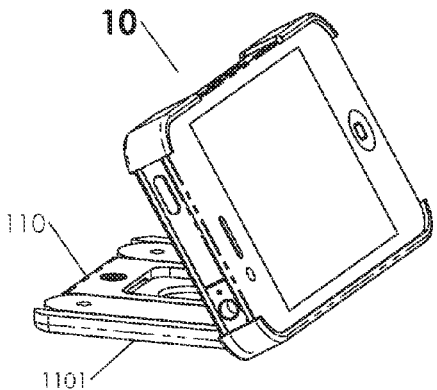

In various embodiments, a case design can include additional features allowing the iPhone to be secured to the case in more than one orientation and/or position, including a rotated or "portrait" configuration, which can facilitate use of the phone and/or camera by the user. As best seen in FIGS. 58 and 59, the case 200 includes a right side opening 2004 (see FIGS. 44 and 45) which is desirably sized and configured to accommodate the camera 300 in a 90 degree rotated orientation (i.e., a portrait orientation). In this arrangement, the iPhone 300 is secured at a bottom surface 3006 by a lip 2009 on the left side 2005 of the case (see FIGS. 46 and 47), and further secured at a medial position by projecting lips 2012 on the right side edge 2006 (see FIGS. 44 and 50). This arrangement desirably secures the iPhone in an upright configuration for the user's convenience. Once the use of the iPhone has been completed in this orientation, the user may reattach the case in its normal orientation (if desired).

During normal usage, an iPhone 300, case 200 and support assembly 100 can assume a minimal or collapsed configuration, such as shown in FIG. 61. This arrangement will desirably maintain the support assembly 100 flush with and/or clear of the edges of the case/iPhone, such that the hinge assembly 1320 (see FIG. 62) does not extend beyond the side edge of the case 200 (see FIG. 61). This collapsed condition desirably minimizes the profile of the stand, and allows the phone to be utilized in a typical manner with the case and stand attached thereto with minimal interference. When use of the stand is desired, however, the sliding plate 130 can be slid relative to the fixed plate 140, thereby positioning the hinge assembly 1320 adjacent to and/or beyond the edge of the case (see FIGS. 65 and 66). Moving the hinge assembly 1320 beyond the edge of the case/iPhone subsequently allows the hinge assembly to rotate more than 180 degrees (i.e., a rotation of 270 degrees or greater in the embodiment of FIGS. 66 and 67). This increased rotational freedom of the hinge assembly facilitates deployment of the base 110 and legs 120 relative to the sliding plate 130, and in various embodiments can permit the base 110 and legs 120 to be splayed apart a minimum of 90 degrees or more (creating a very stable base) while allowing the case and PED to freely assume a variety of inclined and/or declined orientations (see FIGS. 66 and 67) relative to the splayed base and legs. As can be best seen from FIG. 67, the case and PED of the depicted embodiment can be rotated over 180 degrees with the stand fully deployed, which is significantly more rotation than could be accomplished if the outer surface of the hinge were positioned flush with and/or recessed from the edge of the PED/PED case. By providing for lateral advancement of the hinge assembly beyond the edge of the PED/PED case when deployment is desired, while also allowing for the hinge to be brought flush with or recessed from the edge when the assembly is collapsed, the present embodiment significantly improves the usability and convenience of the support assembly.

Figure 80:
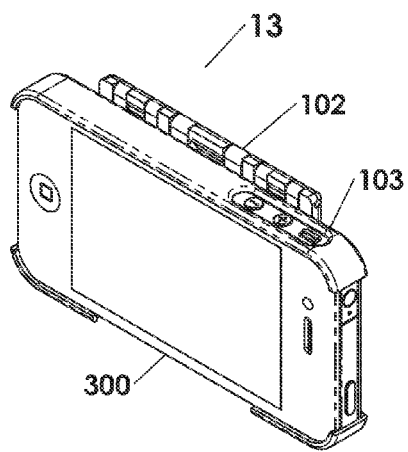
FIGS. 80-83 depict various views of another alternative embodiment of a support assembly, case and PED including a non-sliding hinge design.
Figure 81:
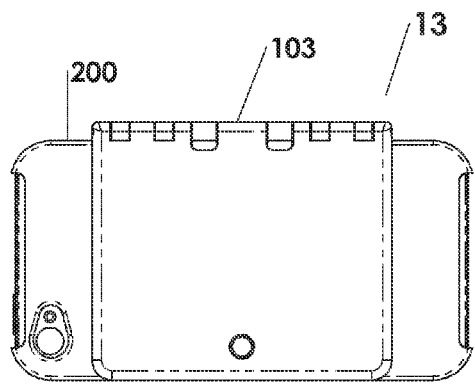
Figure 82:
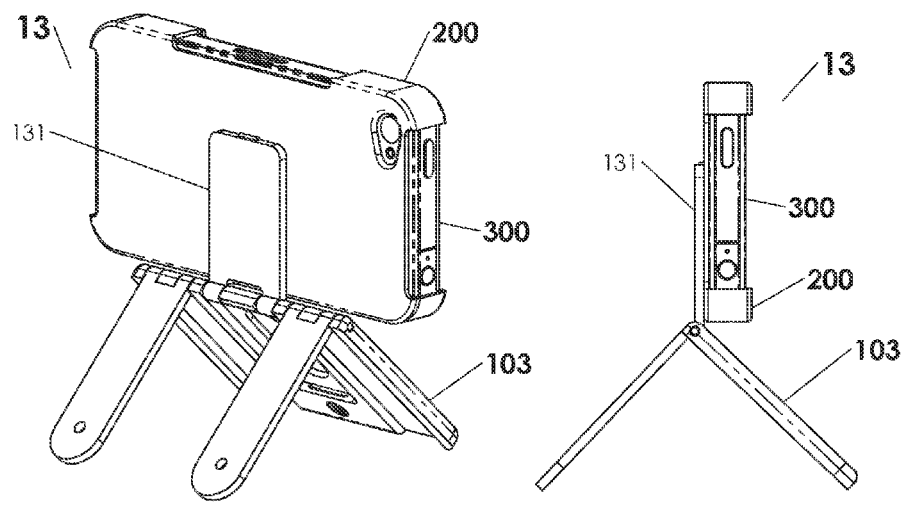
Figure 83:
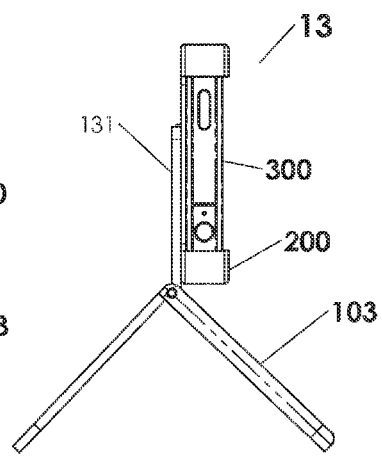

Once use of the stand is completed by the user, the legs of the stand can be rotated back into the base (see FIG. 66), and the base rotated against the sliding plate 130, with the hinge assembly extending outward of the edge of the PED/case (see FIG. 80, as a similar example). The sliding plate 130 can then be slid relative to the fixed plate (see FIG. 65, in reverse motion), with the hinge assembly 1320 eventually flush with and/or recessed from the edge of the case 200. The support assembly is then in the closed or storage condition.

Auxiliary Support Devices

FIGS. 68 through 70 and 71 through 75 depict embodiments of a support assembly incorporating various attachment features that can facilitate the use of auxiliary support and/or stabilization devices such as camera tripods, bipods, monopods and/or adhesive/suction (permanent and/or semi-permanent) mountings. In these embodiments, the base 110 of the support assembly 10 can include one or more openings 1111 (see FIGS. 70 and 21) that facilitate attachment to various other devices. The opening 1111 can comprise a threaded opening sized for attachment to a standard size tripod mount, such as a ¼-20 Unified National Coarse (UNC) thread or a ⅜-16 UNC thread. In various alternative embodiments, the base 110 can include a plurality of such openings, including openings of different sizes in different locations. In the disclosed embodiment, the base 110 could include an opening 111 having an internal female thread, which could allow the consumer to employ corresponding male threaded or other devices for a variety of functions. Such functions could include attaching to a tripod (see FIG. 70) or a suction cup or similar mount (see FIGS. 71 through 75), or the opening 1111 itself could be used to accept a string, rope or flexible cord, with the cord used to secure the support assembly to a pipe or tree limb (see FIG. 121). In various embodiments, the opening 1111 could be used to attach the support assembly and/or case directly to a PED (not shown).

Figure 70:
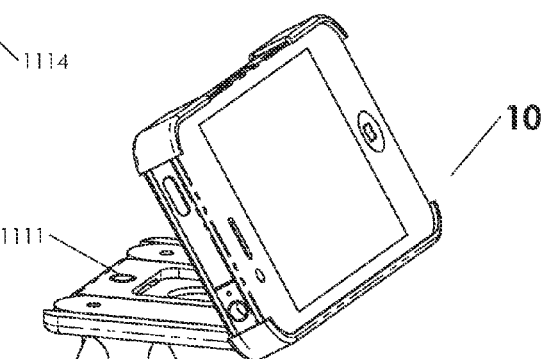
FIG. 70 depicts a perspective view of the support assembly, case and mobile phone of FIG. 69 attached to a standard tripod using a base assembly screw hole.

In one embodiment, the female thread bore 1111 may be used to attach to a standard tripod design as shown in FIG. 70. FIG. 70 depicts a perspective view of a support assembly 10, case and PED attached to a standard or typical tripod 400 using a standard screw fitting (not shown) that extends into the threaded female opening 1111. This arrangement would provide a user with additional flexibility in altering the height and rotational movement of the PED to take photographs or record videos, as well as improve stability of the PED. The female thread bore 1111 may be designed to fit any standard male screw thread used in various standard tripod designs, including professional tripods, bipods and/or monopods, or a customized male screw thread may be provided with an optional coupling if desired. This arrangement also facilitates the use of tripod equipment or similar devices where the PED itself does not include a standard screw-in tripod attachment point (which is the case with devices such as the iPhone and iPad). Moreover, the through-hole design of the opening 111 can allow the tripod screw to be inserted in either a bottom-up or a top-down alignment (from either side of the base 110). Custom configurations to attach a plate or "quick-release" type device can also be added to this area, if desired.

Once the tripod is attached to the base 110, the PED can be adjusted using the hinge mechanism of the support assembly as previously described. Alternatively, the tripod may include a ball-joint or other mechanism that allows the head of the tripod to be adjusted. However, the adjustability of the present design obviates much of the need for an adjustable ball-head on the tripod, which can significantly simplify the design and cost of the tripod, as well as significantly increase its durability and reduce its overall weight.

Figure 71:
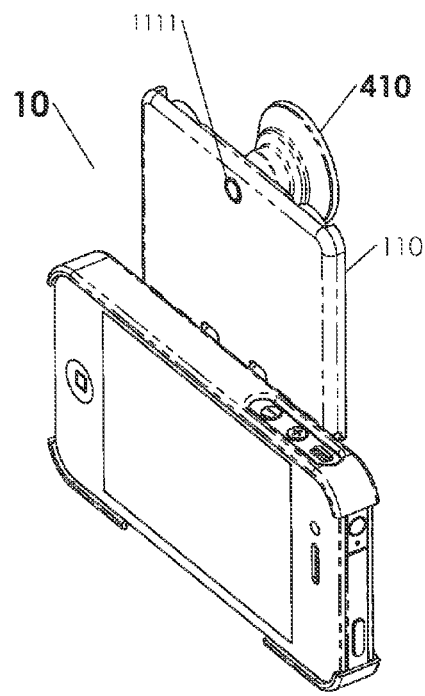
FIGS. 71-72 depict perspective views of a support assembly, case and mobile phone attached to a suction cup or other securement device in alternative configurations.
Figure 72:
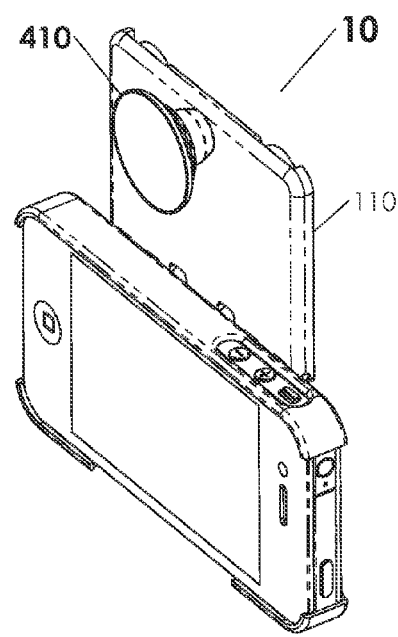
Figure 73:
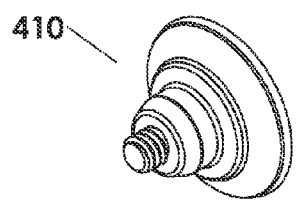
FIGS. 73-75 depict various views of one exemplary embodiment of a suction cup attachment device.
Figure 74:
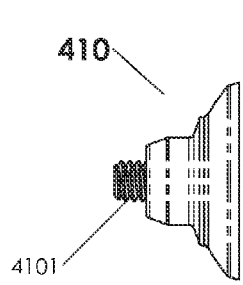
Figure 75:
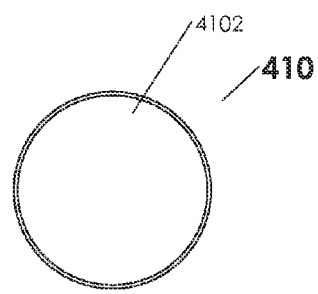

In another embodiment, the female thread bore 1111 may be used to attach a suction cup 410 as shown FIGS. 71 through 75. FIGS. 71 through 72 depict perspective views of the support assembly 10 with the base assembly 110 in a partial open configuration showing various placements of a suction cup 410. The suction cup 410 may be used to provide the consumer with the flexibility to attach the stand or support fixture assembly 10 to a vertical, horizontal or angled surface, it may provide the consumer with the ability record real time video while driving the car, and/or the consumer may wish to provide additional securement or stability to a flat or gently curved surface. The consumer may attach the suction cup 410 to the front of the base assembly as shown in FIG. 72, and/or the user may reverse the placement of the suction cup to the back or rear of the base assembly as shown in FIG. 71. In various embodiments, the attachment of the suction cup 410 to the base assembly 110 female screw bore 1111 may vary. In one embodiment, the suction cup engagement feature may be designed to have a male screw thread 4101 that matches the female screw thread 1111, such as shown in FIGS. 73 and 74. Alternatively, the suction cup engagement feature may have include plug ridges, channels, and/or protrusions (not shown), that may be deformable when inserted through the female screw thread 1111 and resumes its larger size to prevent movement out of the female screw thread bore 1111. This may be customized by the manufacturer, or the consumer may purchase any standard suction cup to use with the female screw thread bore 1111 in the base assembly 110. Furthermore, the suction cup 410 design may include a concave suction area 4102 where the design allows a consumer to press the suction cup 410 against a relatively flat, non-porous surface, to reduce the volume of the space between the suction cup and the flat surface by expelling air or fluid past the rim of the suction cup 410, and once attached the PED can be adjusted relative to the cap 4101 using the flexible hinge of the base as appropriate. This pressing action provides a pressure difference between the outside of the cup, and the inside of the suction cup, keeping the cup adhered to the surface. The concave suction area 4102 may desirably be designed with a variety of diameters.

The larger the diameter of the concave suction area 4102, the more pressure difference that may be observed, thereby creating a stronger vacuum. With this in mind, the suction cup 410 may include other features to assist with peeling the suction cup 410 from the surface, such as tabs (not shown). These peelable tabs could assist the user to peel the suction cup 410 from a surface to let air in, equalize the pressure, and the suction cup then stops the vacuuming function. This type of securement device can have particular utility to mount a PED to smooth, non-porous surfaces such as glass, plastics, metals and/or ceramics. In various alternative embodiments, other fasting systems, such as hook and loop fasteners (i.e., Velcro) can be similarly mounted to the camera and intended attachment surface, as desired.

Figure 121:
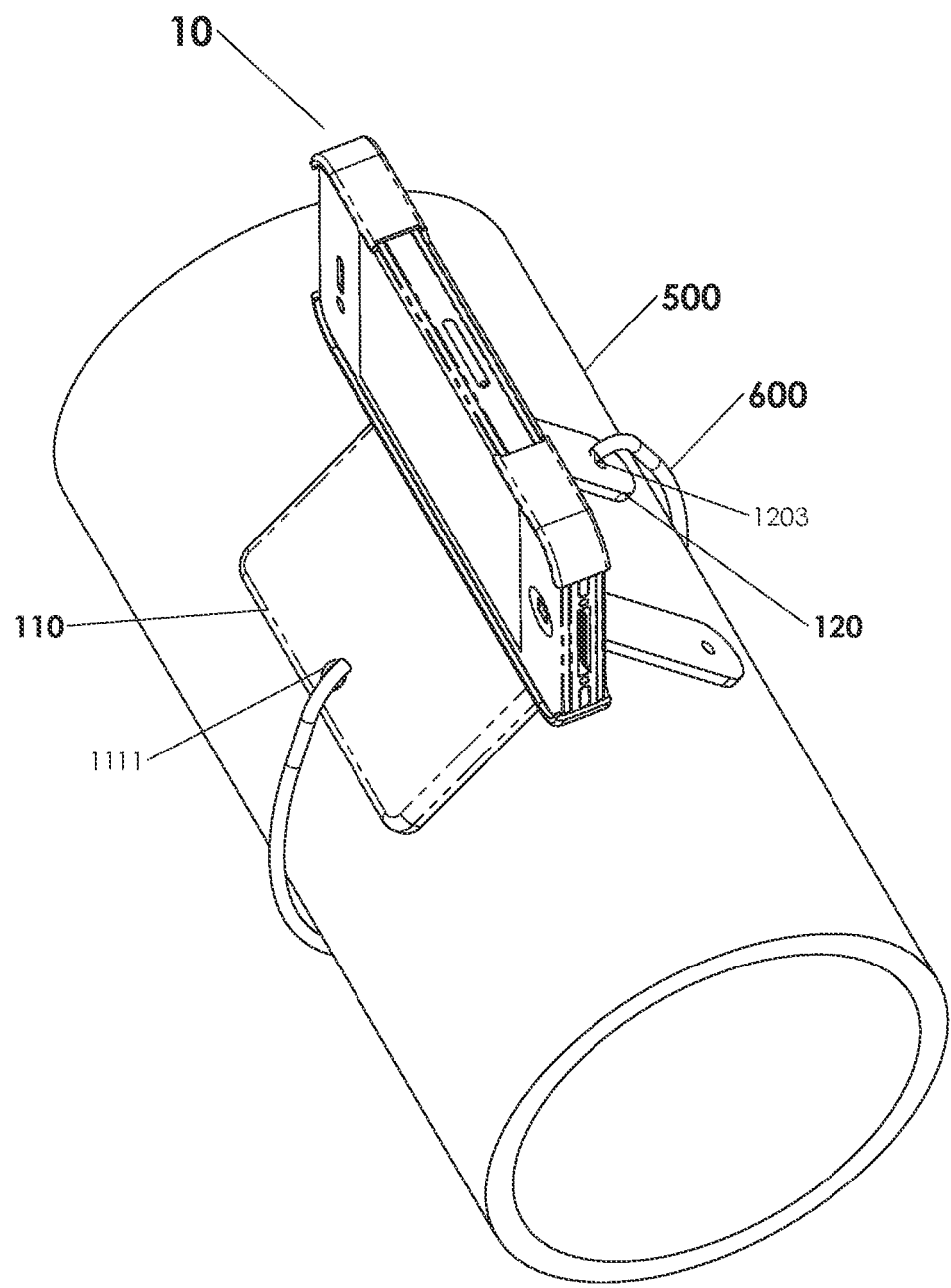
FIG. 121 depicts a perspective view of the support assembly, case and PED of FIG. 57, with the support assembly attached to a pole or tree limb using a flexible or expandable cord.

FIG. 121 depicts another alternative embodiment of a support and stabilization assembly 10 constructed according to various teachings of the present invention. In this embodiment, the female thread bore 1111 may be used to attach and/or insert a connecting member 600 for hanging or securing purposes. FIG. 121 is a perspective view of the stand or support fixture assembly 10 mounted on a pipe, rod or tree limb using a connecting member 600. The connecting member 600 can be threaded through the opening 1111 to secure or hang on a tree limb, pipe, gate, and/or post. The connecting member 600 may also be a string, elastic cord, cable and/or wire. If desired, one or both of the legs 120 of the support assembly 10 can include one or more openings 1203 in their distal ends (which are desirably distal to the hinge assembly). The openings 1203 can be used as attachment or securement points for attaching a flexible rope, wire or string 600 to the legs, and the opening 111 in the base 110 can be used in a similar manner. In the embodiment of FIG. 121, the support assembly 10 is expanded, with the base 110 and legs 120 positioned on the surface of the pipe 500. A rope or elastic cord (i.e., a Bungee cord or similar securement device) can be secured to one or both of the openings 1203 and the opening 111 in the base 119, and wrapped around the pipe 500 to secure the PED to the pipe 500. The PED can then be adjusted relative to the base 110 and legs 120 by rotating the PED around the hinge assembly, as previously discussed.

In various alternative embodiments, the support assembly can including level reference points and/or leveling indicators, including graduated measurement indicators and/or one or more bubble levels, if desired.

Alternative Configurations

The various components described herein may be formed in a variety of shapes, sizes and/or configurations. For example, the base 110 may be formed in a variety of shapes and configurations, which will desirably facilitate the use of the base as a support component and/or other structure for the stand or assembly 100. In various embodiments, the base will desirably form part of the support structure which positions and stabilizes a PED on a given surface, and in many embodiments will include recesses or other features for the remaining legs and/or other components of the assembly to allow the assembly to be collapsed into a slim, compact profile.

If desired, the base may be designed in a variety of shapes and/or dimensions, including those having one or more edges or other features to assist with stabilization on a surface. In one embodiment, the shape of the base 110 may be configured to a rectangular shape 1103, such as the example shown in FIG. 16. However, a variety of other shapes may be utilized, such as a triangular shape (not shown), oval shape (not shown), trapezoidal shape (not shown), pentagon shape (not shown), bifurcated shape (see FIGS. 115-120 and 122-132), pointed shaped (FIGS. 76-77), toothed shape (not shown) and/or any combinations thereof.

Figure 100:
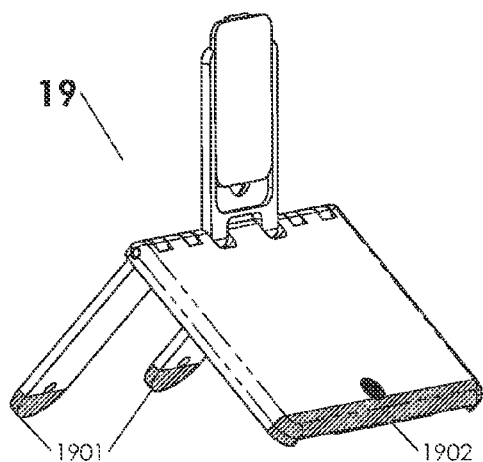
FIGS. 100-101 depict perspective views of alternative embodiments of a support assembly incorporating "gripping" surfaces or other materials.
Figure 101:
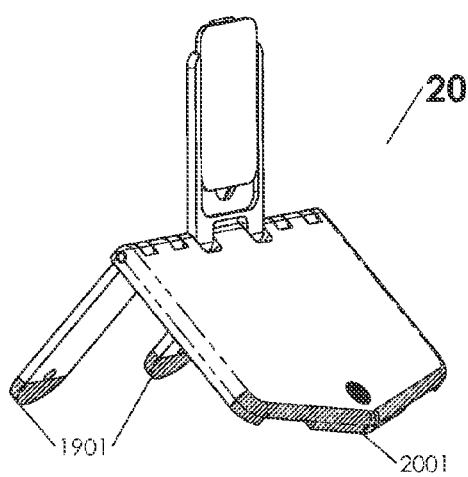
Figure 102:
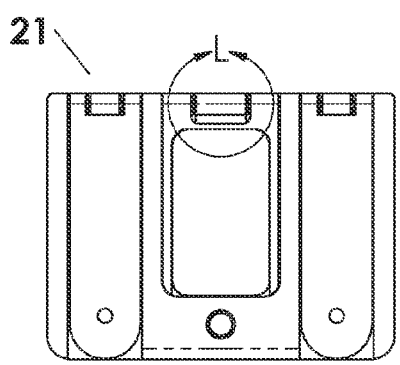
FIG. 102 depicts a back-side view of another alternative embodiment of a support assembly, incorporating frictional rotation restrictors or "spring washers" in the hinge features.

In various alternative embodiments, a base 110 may include surface gripping or anti-skid features to desirably enhance gripping and/or frictional resistance on a surface, such as shown in the embodiments of FIGS. 100 and 101. FIG. 100 depicts one exemplary embodiment of a support assembly 19 with gripping features applied on the base edge

1902 and the distal tips 1901 of the legs. FIG. 101 depicts an alternative embodiment of a support assembly 20 with a pointed base assembly having gripping features provided on the base edges 2001 and the leg edges 1901. These surface features may be manufactured integrated with the base or may comprise one or more modular pieces that may be purchased with the stand or support fixture assembly or purchased independently for placement onto the base. Any variety of gripping materials may be used that can help with creating a high-friction surface, and may be applied by spraying, adhesive backed, injection molding and/or laminated. Such materials may include traditional rubber grips from natural rubber, elastomeric gripping materials (that maintain a tacky, soft but firm feel), synthetic rubber, leather, cord/half cord grips, and/or any compound materials in conjunction with a number of surface configurations and/or tactile feel that offer different gripping characteristics. In various other embodiments, gripping features may be provided on virtually any portion of the base and/or leg surfaces, on select base or leg surfaces, on the PED case, on any of the base or leg perimeter edges, and/or on the legs perimeter edges (or various combinations thereof). If desired, the gripping features may comprise a flexible and/or elastic material sized such that, when the component is nested within one or more recessed in the base, the gripping features slightly deform and "wedge" the components in place to resist inadvertent deployment by the user.

Figures 19, 21:
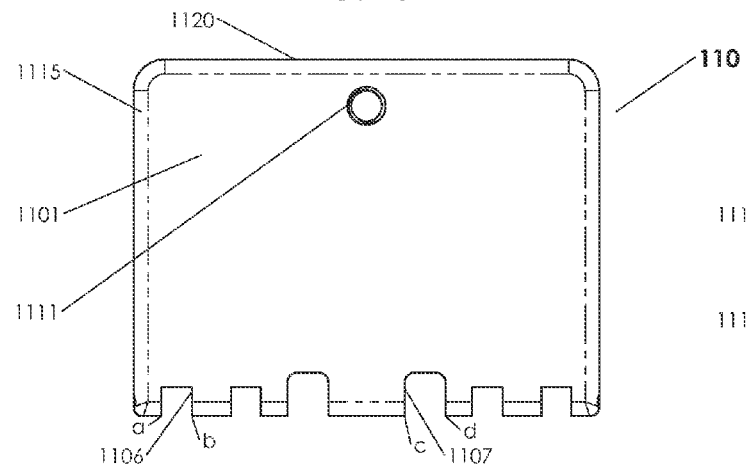
FIG. 21 depicts a front side view of the base of FIG. 16.
Figure 22:
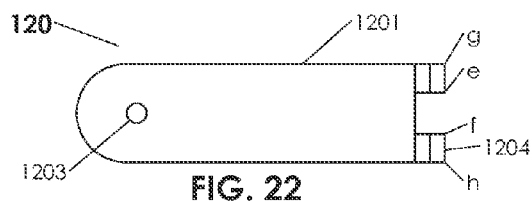
FIGS. 22-26 depict various views of one embodiment of a support leg.
Figure 24:
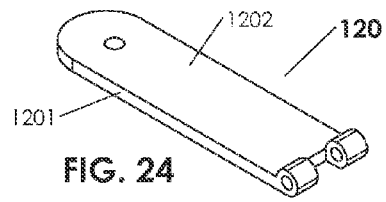
Figure 23:
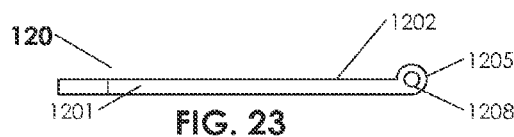

As best seen in FIGS. 11, 16 and 21, one embodiment of a base 110 can comprise a square or rectangular shape, with a relatively flat or planar lower edge 1120. Depending upon the texture and/or surface features of the intended surface (i.e., the support surface) against which and/or upon which the base is to be placed, the shape of the base edge may or may not provide sufficient support and stability to accomplish the user's objectives. While a relatively smooth surface may accommodate a flat, planar base surface, a more irregular and/or uneven support surface may be less suitable.

Figure 76:
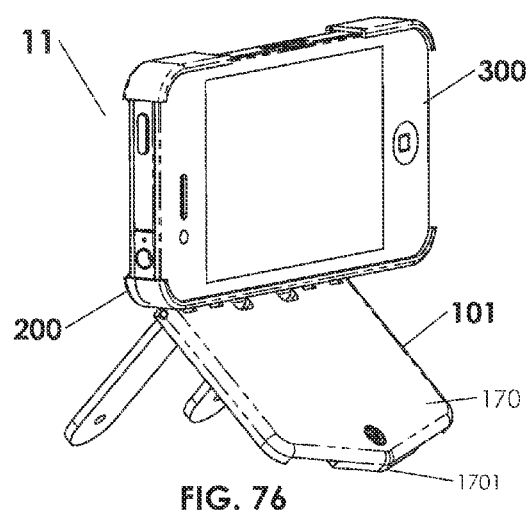
FIG. 76 depicts a perspective view of an alternative embodiment of a support assembly, case and PED.
Figure 77:
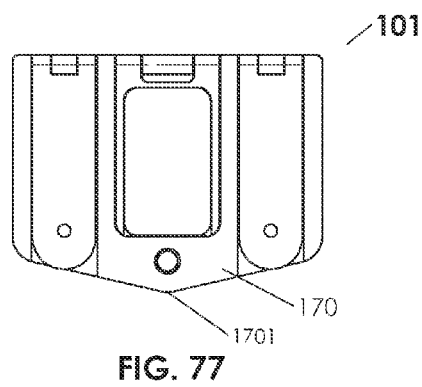
FIG. 77 depicts a back-side view of the support assembly of FIG. 76 in a closed or retracted configuration, without an attached case or PED.
Figure 78:
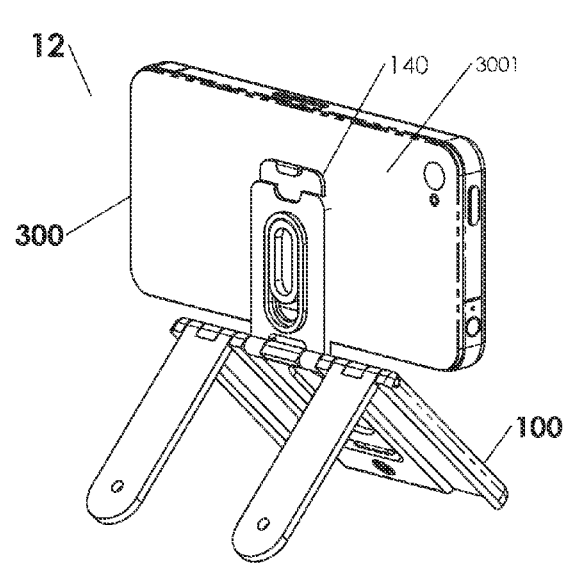
FIG. 78 depicts a perspective view of another alternative embodiment of a support assembly, with the support assembly directly attached to a surface of the PED.
Figure 79:
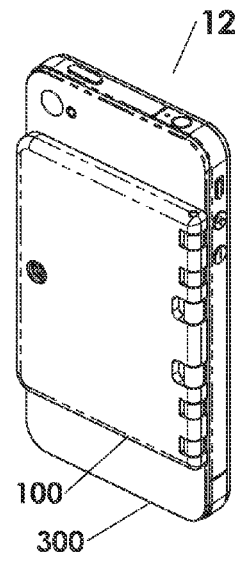
FIG. 79 depicts a perspective view of the support assembly and PED of FIG. 78, with the support assembly in the closed or retracted configuration.

FIGS. 76 and 77 depict one alternative embodiment of a support assembly 11 incorporating a base 101 having a tapered lower portion 170 with a centrally located "pointed" tip 1701. In this embodiment, the lower portion 170 of the base 101 is designed to typically contact the support surface at the tip. For uneven or rough support surfaces, this design may be particularly well-suited when compared to a planar edge. For example, the pointed tip may be positioned or placed into a crevice or depression in the support surface (not shown), which can potentially secure the PED more firmly in a desired position and/or orientation than a relatively flat edge might be able to accomplish. In various alternative embodiments, the legs and/or base may be designed with a variety of alternative shapes that may improve stabilization, which could include the use of pointed edges (not shown), bifurcated legs (not shown), triangular legs (not shown), greater wall thickness (not shown), varying wall thickness, toothed surfaces and/or ribbing (not shown), radiused edges 1209 (see FIG. 26), cut-outs (not shown), leg holes 1203 (see FIG. 22), concave tips (see FIG. 78), convex tips (not shown) and/or any combinations thereof. In various embodiments, the terminal or distal edges of the legs and/or base (i.e., distal from the hinged portion) might include various surface features, textures and/or component materials to assist with securement and/or accommodation of a variety of surface types and/or textures.

FIG. 77 depicts a flat plane view of the base 101 in a collapsed configuration, with the legs folded into corresponding depressions in the base 101. In this embodiment, the collapsed legs will desirably fit fully within the base. However, because of the tapered portions of base 101, the legs may be formed somewhat shorter than the comparable legs 120 of the embodiment of FIG. 8, so as to fit within the base 101, if desired.

FIGS. 80 through 83 depict another alternative embodiment of a support assembly 13 constructed in accordance with various teachings of the present invention. In this embodiment, a fixed plate 131 is secured to the case 200 (or directly to the PED), and the fixed plate 131 includes a hinge body 102 that is rotatably connected to a base 103. The base desirably extends beyond an edge of the case 200, which facilitates the rotation of the base 103 about the hinge body 102 more than 180 degrees relative to the case 200. In various embodiments, the hinge body 102 will extend above a side edge of the case 200, which can also serve to protect and/or shield various components of the iPhone 300 from contact with other objects, such as the volume buttons shown in FIG. 80. Moreover, this embodiment may be particularly useful for PED's of increased size and/or weight, such as tablet or laptop computers, where the inclusion of a sliding and/or rotating joint between the fixed plate and base 103 may undesirably weaken the support assembly, may be undesirable for some other reason, may unnecessarily increase cost and/or complexity of the support assembly and/or may be unnecessary. In various alternative embodiments, a plurality of fixed plates (similar to the attachment method shown in FIG. 116, for example) could be attached to the case 200 and/or iPhone 300, including the use of 2, 3 or more plates. In such alternative embodiments, the plates may be spaced apart (i.e., sandwiching the legs) along the case 200, or may be positioned adjacent to one another.

Locking/Stop Hinges

Figure 18:
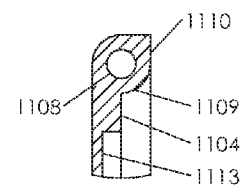
FIGS. 18 and 19 depict partial cross-sectional views of areas "B" and "C" of FIG. 17, respectively.
Figure 17:
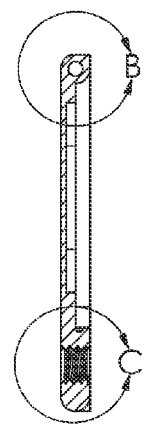
FIG. 17 depicts a cross-sectional view of the base of FIG. 16, taken along line A-A.
Figure 20:
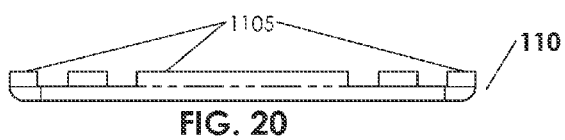
FIG. 20 depicts a bottom plan view of the base of FIG. 16.
Figure 25:
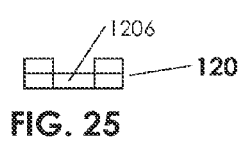
Figure 26:
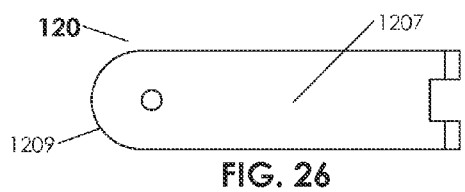
Figure 43:
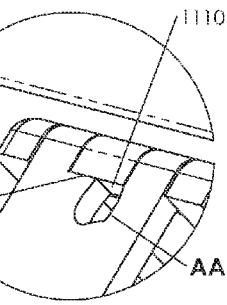
FIG. 43 is an enlarged view of area "E" of FIG. 42, showing a partial cutaway view of the leg and base assembly.

As best seen in FIGS. 16 through 18, 42 and 43, the hinged portion of the base and associated legs can include stop or limiting features that allows substantially free rotation of each leg 100 relative to the base 110, yet interact to prevent rotation beyond a certain pre-defined amount. For example, the base 110 of FIGS. 16 through 18 depict a rounded hinge section 1109 having a relative flattened planar face section 1110. As best seen in FIG. 25, each leg 120 includes a relative flat planar face section 1206 adjacent the rounded leg hinge 1205. Once assembled together, such as shown in FIGS. 42 and 43, the legs can rotate relative to the base until the planar face sections 1206 of each leg contacts the corresponding planar face section 1110 of the base 110, which stops further rotation. FIGS. 42 and 43 show a cutaway portion "AA" in which the two planar faces contact each other, which in the disclosed embodiment is approximately 90 degrees of rotation from the nested or closed position. This arrangement desirably allows the legs to be rotated from a nested or closed position to a deployed or open position when desired for use. In alternative embodiments, the various faces 1110 and 1206 can be repositioned to allow for varying degrees of rotation, including amounts greater than or less than 90 degrees of rotation.

In various embodiment, the legs will experience some minimal resistance to rotation as they are moved relative to the base, which desirably prevents unintentional rotation of the legs in an undesirable manner. Such resistance may be intentionally designed into the stand, such as by using tolerancing and/or design stacking for the component parts, or the hinge pin 150 and/or hinge openings 1108, 1208 and 1311 can be designed to inhibit, but not substantially prevent, rotation of one or more components.

FIGS. 84 through 88 depict one alternative embodiment of a stand or support assembly having an alternative arrangement for positioning and/or locking leg position. In this embodiment, the stand 14 includes a base 171 and one or more legs 120 that do not incorporate a stop or limiting feature to inhibit the legs 120 from rotating beyond a certain limit relative to the base 171. For example, the hinge section 1712 of the base can be completely rounded, and thus not include a flattened section to inhibit rotation (see FIG. 85). Accordingly, the legs 120 can rotate freely between a nested position within the base to a position adjacent a side of the PED or case, including the various positions A, B, C and D depicted in FIGS. 86 through 88. Moreover, this arrangement facilitates the positioning of the individual legs 120 in different positions relative to the base 171, such as shown in FIG. 88, which may facilitate placement and/or stabilization of the PED on extremely irregular and/or uneven surfaces where independent adjustment of the legs to differing angles may be advantageous. Desirably, the resistance to rotation of the legs 120 in this embodiment will be significantly increased, such that rotation of the legs is possible, but the legs are capable of supporting the PED in a desired position once the legs have been rotated to a desired position by the user (i.e., the support assembly won't collapse when the legs are released by the user).

Connecting Mechanisms

A variety of alternative connecting mechanisms can be utilized in conjunction with the various embodiments described herein to render the support assembly more and/or less permanently mounted to the PED or case. In various embodiments, it may be desirable for the support assembly to be selectively mountable to the PED and/or case, while facilitating removal and/or storage of the assembly when use of the assembly is not anticipated. In various embodiments, the assembly may include one or more components that are permanently and/or removably mounted to the PED and/or case (or integrated therein), with the remainder of the support assembly integrating or "docking" to the component. If desired, a single such component may integrate with a variety of different alternative devices and/or supports, which can include the various support assembly embodiments described herein, as well as belt hooks or clips, notepads, clipboards, dashboard mounts, etc.

Figure 89:
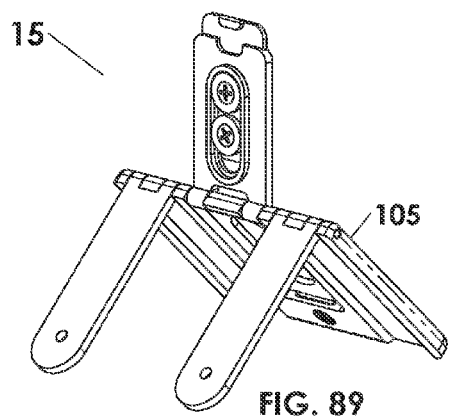
FIGS. 89-90 depict perspective and exploded views of another alternative embodiment of a support assembly.
Figure 90:
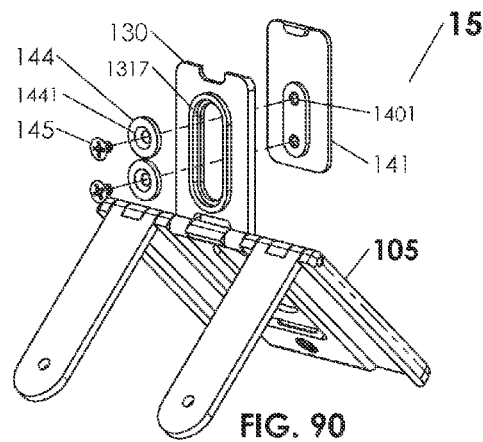

FIGS. 89 and 90 depict an embodiment of a stand or support assembly 15 having a detachment feature between a fixed plate component 141 and a sliding plate component 130. The fixed plate 1412 in this embodiment include one or more threaded bores 1401 which accept corresponding threaded screws 145 therein. A threaded section 1461 of each screw 145 extends through an inner bore 1441 of a corresponding spacer or washer 144, with an opening 1317 in the sliding plate 130 sandwiched between the washer 144 and the fixed plate 141. In the disclosed embodiment, a plurality of screws 145 secure the sliding plate 130 to the fixed plate 141, although the use of single screws and/or multiple screws (i.e., three or more) is contemplated herein as well. If desired, the fixed plate can be detached from the rest of the support assembly by removing the screws 145, allowing the stand to removed (and alternatively, can be reattached) from the PED/case and stored separately, if desired. In various embodiments, the washers 144 may incorporate a slidable snap fit or other arrangement that holds the washer within the central opening of the sliding plate 130, desirably allowing detachment of the assembly from the fixed plate while retaining the washers and screws within the sliding plate for storage and/or reattachment when desired.

Figure 93:
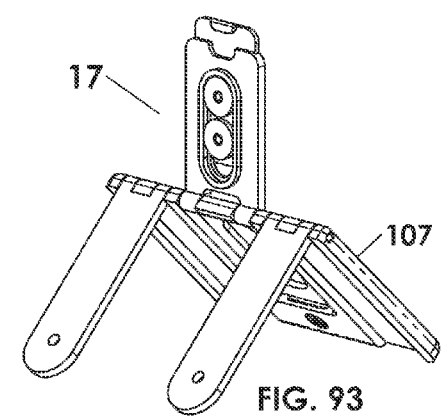
FIGS. 93-94 depict perspective and exploded views of another alternative embodiment of a support assembly.
Figure 94:
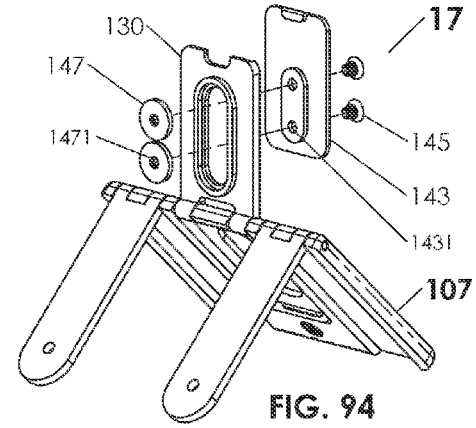
Figure 95:
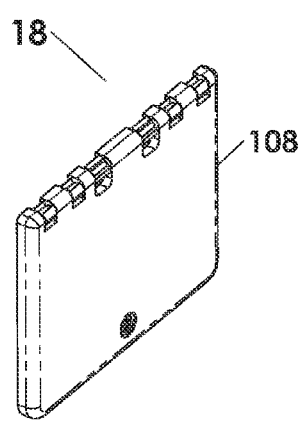
FIGS. 95-99 depict various views of another alternative embodiment of a support assembly, with the various components employing "snap-on" fittings and receivers.

FIGS. 93 and 94 depict an alternative embodiment of a stand or support assembly 17 having an alternative detachment feature between the fixed plate component 143 and the sliding plate component 130. In this embodiment, the screws are reversed, and extend through openings 1431 in the fixed plate 143, with a threaded portion of each screw extending through the central opening in the sliding plate 130 and into corresponding threaded bores 1471 in cap washers 147. Desirably, the sliding plate 130 is sandwiched between the cap washers 147 and the fixed plate 143. If desired, the fixed plate can be detached from the rest of the support assembly by unscrewing the cap washers 147 from the screws 145, allowing the stand to removed (and alternatively, can be reattached) from the PED/case and stored separately, if desired. In various embodiments, the cap washers 147 may incorporate a snap fit or other arrangement that holds the washer within the central opening of the sliding plate 130, desirably allowing detachment of the assembly from the fixed plate while retaining the washers within the sliding plate.

Figure 91:
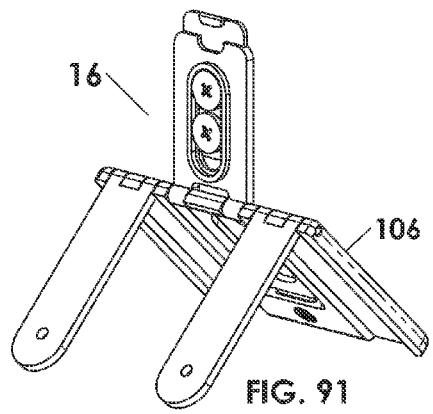
FIGS. 91-92 depict perspective and exploded views of another alternative embodiment of a support assembly.
Figure 92:
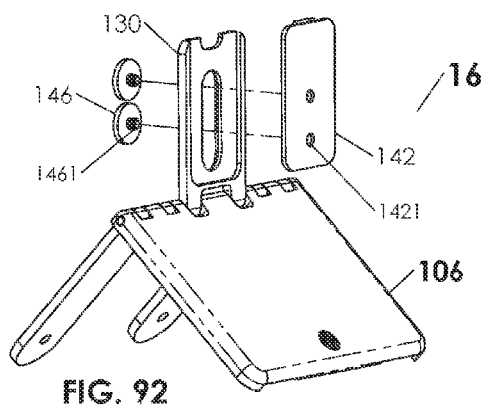

FIGS. 91 and 92 depict another alternative embodiment of a stand or support assembly 16 having an alternative detachment feature between the fixed plate component 142 and the sliding plate component 130. In this embodiment, a pair of expanded head screws 146 are employed to sandwich the sliding plate 130, with a threaded portion 1461 of each screw extending through a central opening in the sliding plate and into a corresponding threaded bore 1421 of the fixed plate 142. If desired, the fixed plate can be detached from the rest of the support assembly by removing the screws 146, allowing the stand to removed (and alternatively, can be reattached) from the PED/case and stored separately, if desired.

Removable Components

Figure 96:
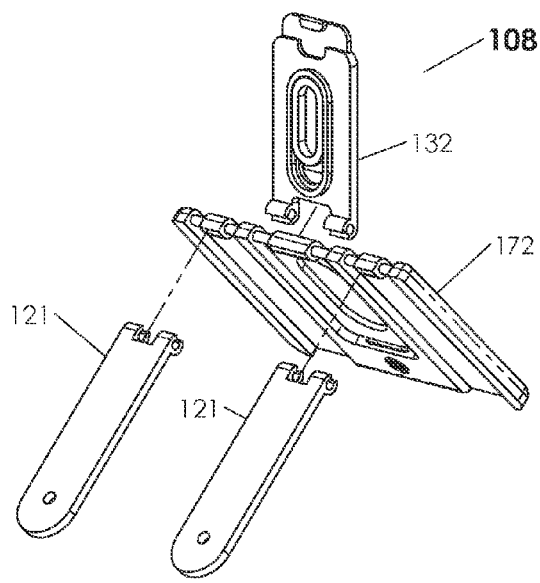
Figure 97:
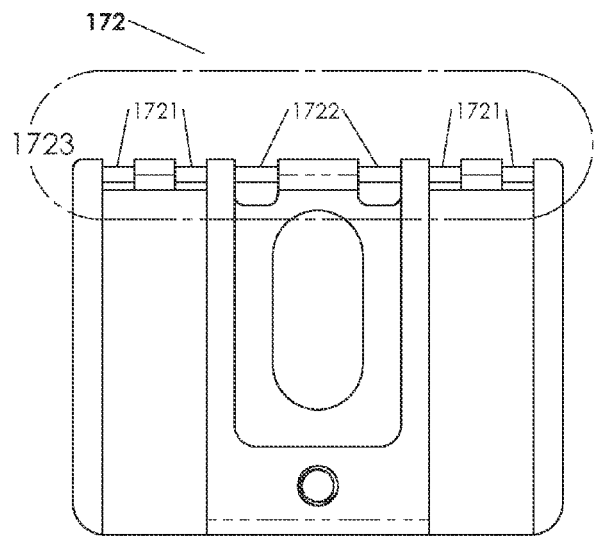
Figure 98:
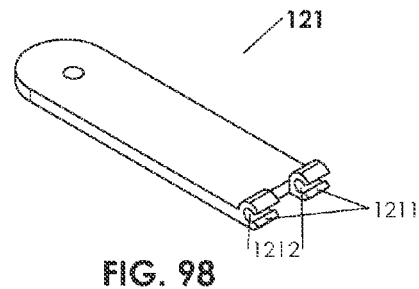
Figure 99:
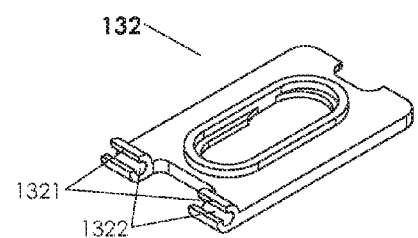

In various embodiments, the stand or support assembly can include attachable features or components that facilitate assembly and/or disassembly of the support assembly. FIGS. 95 through 99 depict one embodiment of a support assembly 18 having press-fit or "snap-on" type attachment mechanisms for securing the legs 121 to the base 172, and the base 172 to the sliding plate 132. Each of the legs includes pairs of opposing snap arms 1211, each pair having a bore 1212 there between, and the sliding plate 132 has similar pairs of opposing snap arms 1321, with a bore 1322 there between. The base 172 includes a proximal section 1723 having a series of rods 1721, with the snap arms and bores of the legs 121 and sliding plate 132 attaching thereto in a known fashion, such as shown in FIG. 96. This arrangement significantly simplifies the assembly of the stand 18, and also significantly reduces manufacturing costs for the various components, which can be made of an injection-moldable plastic material and require little or no drilling, finishing and/or the use of a separate hinge pin component. Moreover, this design facilitates the repair and/or replacement of broken or damaged components, if necessary and/or desirable. In addition, this design facilitates the customization of the support assembly, which may include the incorporation of unique colors and/or patterns into the various components of the stand or support assembly, at the user's option.

Rotational/Deployment Control and Resistance

In various embodiments, it may be desirable to prevent and/or inhibit unintentional rotation or movement of the base, legs and/or sliding plate. For example, when the stand or support assembly is not being intentionally used, an undesired deployment or expansion of the assembly in some manner could interfere with a user's operation of the PED, could expose various features of the support assembly and/or PED to damage and/or breakage, or might simply be annoying and/or uncomfortable.

The design of the support assembly shown in FIGS. 1 and 11 through 13 desirably minimizes the opportunity for unintentional deployment. For example, the legs 120 desirably fold into recesses 1102 in the base 110, and the base 110 in turn folds against the case 200 and sliding plate 130, with the legs 120 sandwiched between the base 110 and the case 200. When collapsed, the sliding plate 130 desirably fits within a corresponding recess 1104 in the base. Desirably, the various rotational joints and other connection mechanisms include sufficient resistance to prevent unintentional movement of the various components, but allow adjustment and movement of the components in response to outside influence, such as urging from the user's hand. Such resistance to unintentional movement can be designed into the various components of the assembly by appropriate tolerancing of the various components such that they resist moving in response to little or no external force, but allowing for component movement in response to intentional force imparted on the component by the user.

If desired, the outer edge of the sliding plate 130 may include nubs or small projections that fit into corresponding depressions or openings in an opposing inner surface of the base recess 1104, allowing the sliding plate to "snap" into the base plate when the assembly is collapsed (see a similar "locking" arrangement in FIG. 123) In a similar manner, the interacting surfaces between the fixed plate 140 and the sliding plate 130 can include texturing or other features to inhibit unwanted movement, except where the user intentionally manipulates the various components of the support assembly as described herein.

Figure 103:
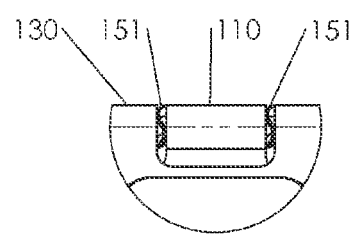
FIG. 103 depicts an enlarged view of the area "L" of FIG. 102.
Figure 104:
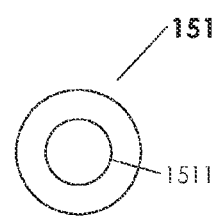
FIGS. 104-105 depict top and side plane views of one embodiment of a spring washer.
Figure 105:
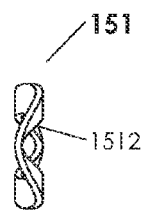

FIGS. 102 through 105 depict one alternative embodiment of a stand or support assembly 21 that includes spring washers 151 between the various rotating components of the assembly. In this embodiment, the use of spring washers 151 between the various rotating components desirably ensures that a minimum rotational resistance between the legs 120 and base is maintained, even after numerous rotation cycles have been performed. Where frictional resistance between moving components can cause component wear and/or loosening, the incorporation of spring washers can reduce wear and/or accommodate for material loss during normal component movement. For example, the hinge components for the base 110 and the sliding plate 130 can be separated by spring washers 151, such as shown in FIG. 103. The presence of the washers 151 can create a desired rotational resistance, even where hinge material has been worn away by repeated relative rotation of the two components. As the base 110 and/or sliding plate 130 material wears, the spring washer 151 can expand, effectively maintaining a desired resistance to rotation between the two components.

Figures 106, 107:
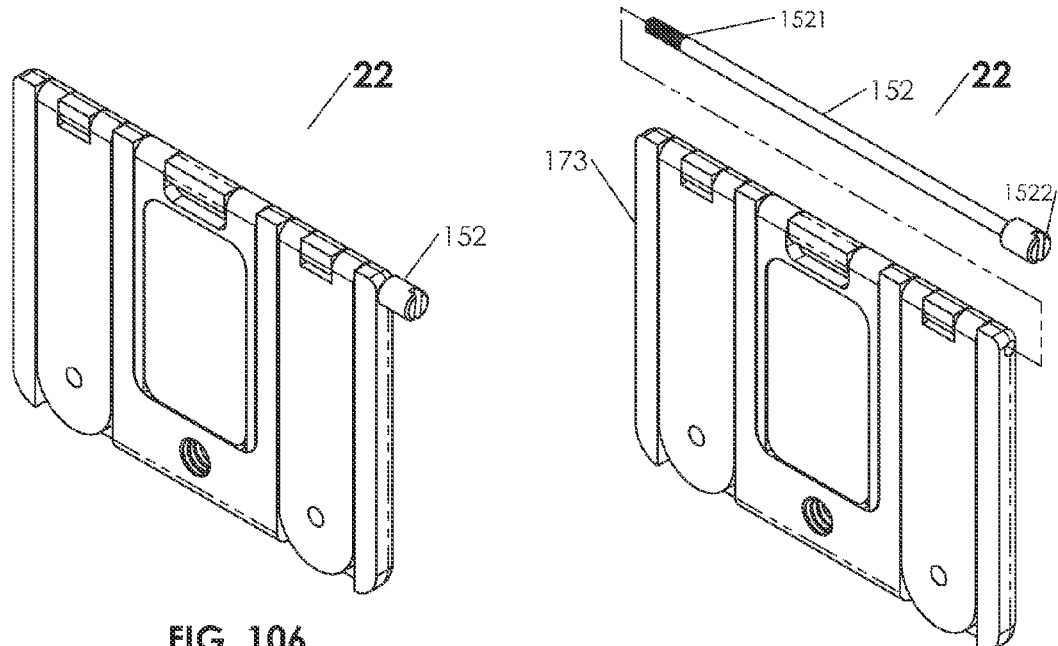
FIGS. 106 and 107 depict perspective view of another alternative embodiment of a support assembly having an adjustable or lockable hinge pin.
Figure 108:
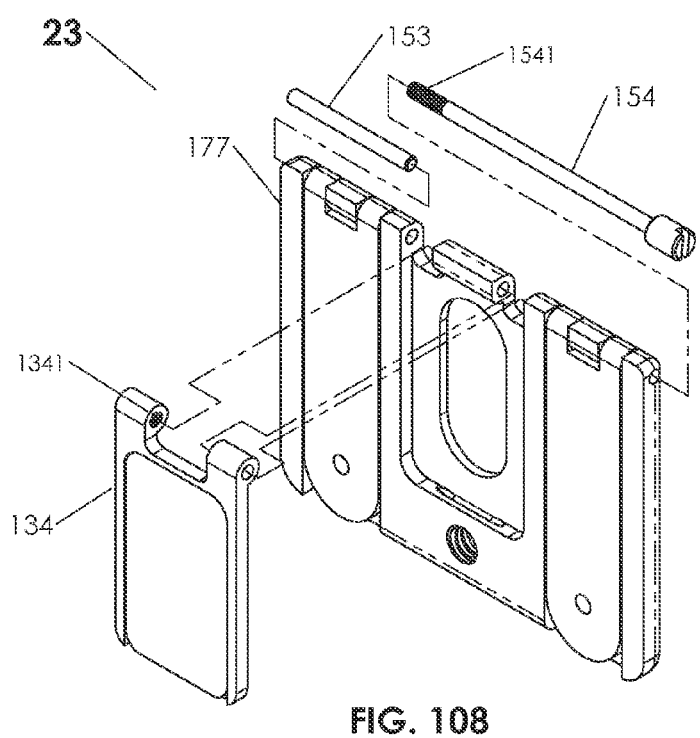
FIG. 108 depicts a partially-exploded perspective view of another alternative embodiment of a support assembly having a multi-piece adjustable or locking hinge pin.

FIGS. 106 and 107 depict one alternative embodiment of an adjustable hinge pin 152 that forms part of an associated support assembly 22. In this embodiment, the hinge pin 152 can be tightened and/or loosened by rotating the head 1522 of the hinge pin 152 clockwise or counter-clockwise using the user's fingers or an implement such as a screwdriver, coin or nail file. Clockwise rotation of the pin 152 desirably rotates screw threads 1521 at the distal end of the pin 152 into corresponding threads (not shown) of the hinge pin bore (not shown) in the base 173, compressing the components together along the hinge and consequently increasing rotational resistance and/or locking rotation of the various components of the assembly. Similarly, counter-clockwise rotation of the pin 152 desirably rotates screw threads 1521 at the distal end of the pin 152 out of corresponding threads (not shown) of the hinge pin bore (not shown) in the base 173, loosening the components apart and reducing rotational resistance and/or freeing rotation of the various components of the assembly. FIG. 108 depicts an alternative embodiment of an adjustable hinge pin, wherein a two-part hinge pin 154 and base 153 combination is used in a similar manner to tighten and/or loosen the rotation of the various components of the assembly.

FIGS. 109 through 114 depict another alternative embodiment of a stand or support assembly 35 incorporating an adjustment and locking arrangement for selective rotation of the legs 123 and base 135 of the assembly. In this embodiment, each of the legs include a spring washer 151 and locking detent mechanisms 1781 and 1231 (which may be machined or molded into the base assembly material, or can be separate components that maybe assembled thereto) on the leg 123 and the base 174 adjacent their respective hinges. Similarly, the base includes a spring washer 151 and locking detent mechanisms 1781 and 1231 between the base 174 and the sliding plate 135. As best seen in FIGS. 113 and 114, the locking detent mechanisms 1781 and 1231 mate with each other, with each of the locking detent mechanism rings including a toothed face that engages when the faces are compressed against each other, desirably locking and/or inhibiting rotation of the rings relative to each other. In various embodiments, the teeth include angled surfaces that, when force is applied by the user and/or when compression is reduced (i.e., where the hinge pin design allows for loosening or lateral displacement of the components to some small degree), allow the rings to slide over and rotate relative to each other in a known manner. As best seen in FIGS. 109 and 110, each component includes a space 1741 adjacent to the hinge pin, which desirably allows some limited lateral movement of the rotating components relative to each other (or which allows the leg to be pushed to the side by the user to desirably disengage the ring faces), which allows the faces of the rings 1781 and 1231 to withdraw from one another and rotate, as previously described. Once a desired position has been obtained, the leg can be released and the spring washer 151 will return the corresponding ring faces to engagement, thereby locking the legs/base in the new desired rotation, orientation and/or position.

BiPod Design

Figure 115:
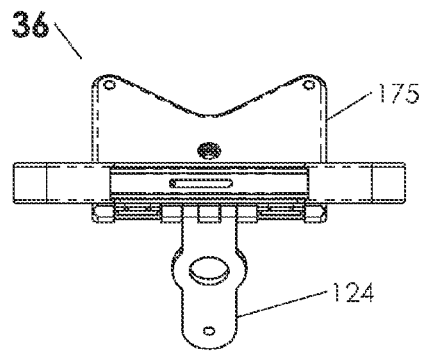
FIGS. 115-120 depict various views of another alternative embodiment of a support assembly, case and PED, the support assembly including a bifurcated base component and dual sliding plates.
Figure 116:
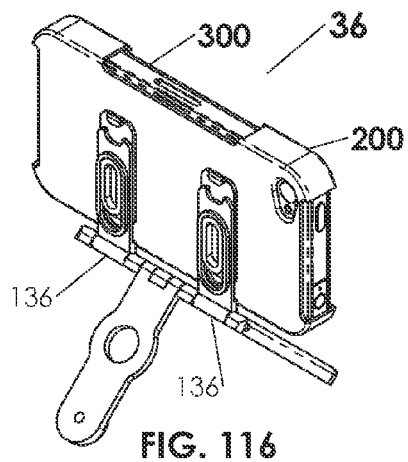
Figure 117:
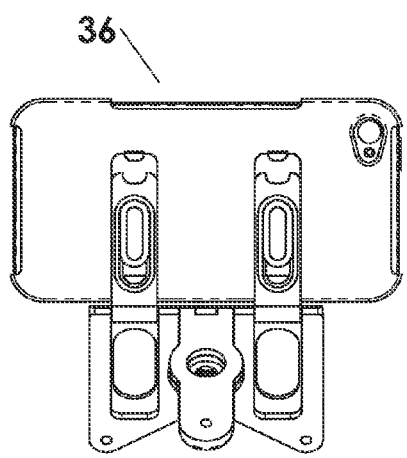
Figure 118:
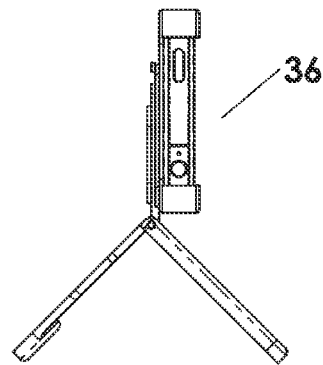
Figure 119:
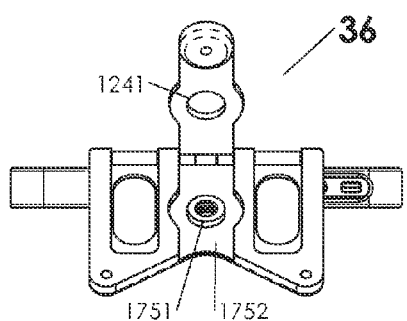
Figure 120:
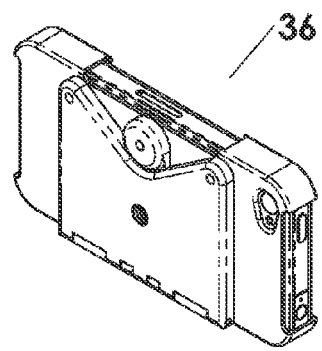

FIGS. 115 through 120 depict another alternative embodiment of a support assembly 36 for use with a PED 300 and/or PED case 200. In this embodiment, the assembly 36 include a base 175 rotatably linked to a single leg 124, the base including a recessed section 1752 that is sized and configured to nest the leg 124 therein when the base and leg are collapsed (see FIG. 20). The leg may be positioned centrally as shown in FIG. 115 to allow for optimal stabilization and balancing, or the position of the leg may be placed wherever appropriate to provide the support assembly sufficient balance and/or stabilization. Alternatively, the design may include two or more legs, similar to the designs described in FIGS. 11 through 13.

The base 175 includes a bifurcated support leg, which desirably allows for increased strength and stability while reducing the number and complexity of components. The bifurcated base 175, in combination with at least a single leg 124, desirably allows the support assembly to remain stable on surfaces having a wide variety of textures and alignments. In such embodiments, the base may include two or more projecting contact points, with each projecting point positioned proximately to each other and/or on the same or different axis to enhance stabilization and balancing. The contact points may be positioned at any distance apart from each other and may lie on different planes (not shown) for stability purposes.

In the disclosed embodiment, the base 175 is desirably rotatably linked to the a pair of sliding plates 136, with the plates slidably liked to a corresponding pair of fixed plates that are attached to the case 200 or directly mounted to the PED 300. The base desirably includes a centrally positioned opening 1751, which includes a threaded portion sized and configured to accept a standard sized tripod screw of other attachment mechanism (similar to the opening 111 of FIG. 21). To accommodate the increase thickness of the base proximate to the opening 1750, the leg desirably includes a recess opening XXXX to accommodate the opening 1750 when the leg is in the nested position. In use, the assembly 36 can be manipulated relative to the PED and case in a manner similar to the embodiments described previously.

Spherically Adjustable BiPod Design

Figure 122:
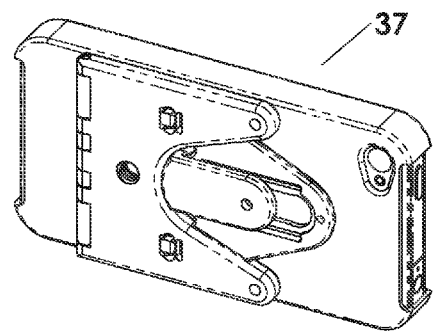
FIG. 122 depicts a perspective view of another alternative embodiment of a support assembly, case and PED, with the support assembly in the fully closed, retracted or "nested" configuration.
Figure 123:
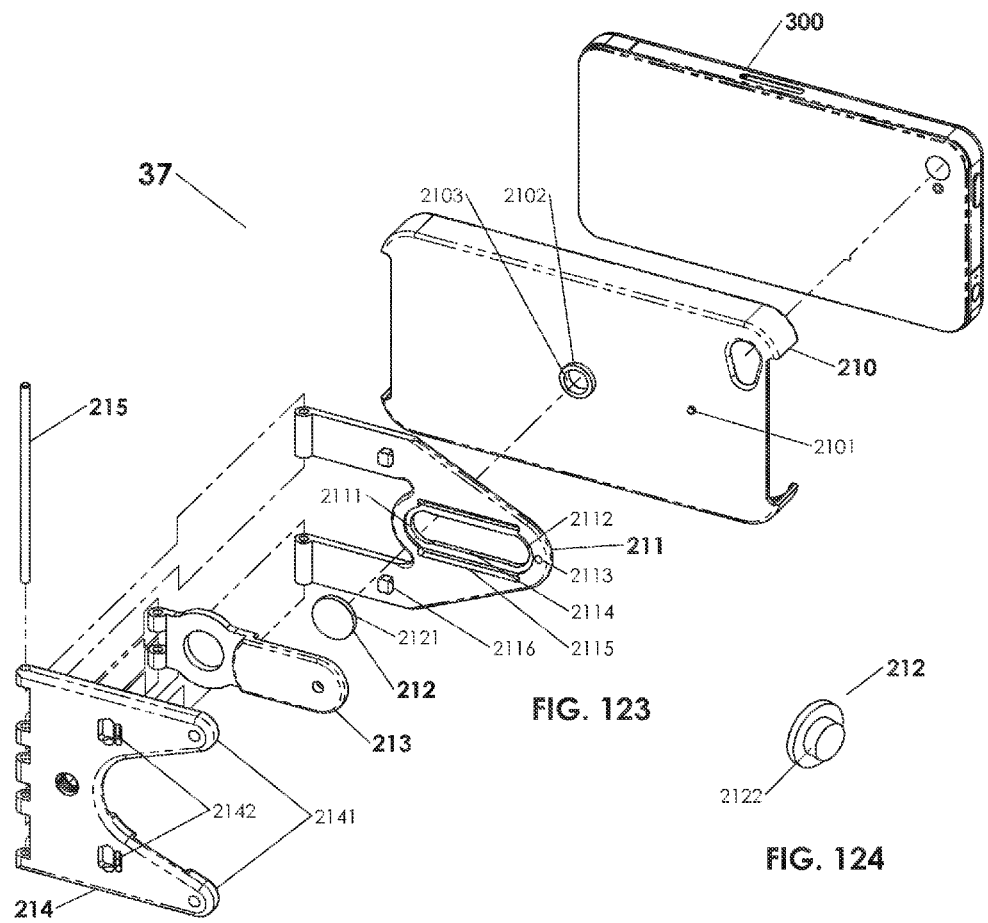
FIG. 123 depicts an exploded view of the support assembly, case and PED of FIG. 122.
Figure 124:
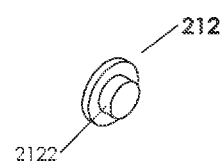
FIG. 124 is a perspective view of the locking cap of FIG. 122.

FIGS. 122 and 123 depict perspective and exploded views of another alternative design for a stand or support assembly for use with a PED or PED case constructed in accordance with various teachings of the present invention. In this embodiment, the assembly is mounted to the PED case 210 via a rounded attachment lug 2102, which includes a raised circular ridge 2102 which desirably extends through an elongated opening 2112 in a sliding plate 211. The sliding plate is sandwiched between the case 210 and a securing cap 212 (see FIG. 212), with the cap 212 including a central stem 2122 sized and configured to engage with the lug 2102 to secure the sliding plate to the case 210 yet allow the sliding plate to rotate and/or slide along the case in a predetermined manner as the ridge 2102 slides along the interior of the elongated opening. The sliding plate 211 includes a hinged distal section that engages with a corresponding hinged section of a base 214. The leg 213 includes a distal portion having a hinged section, with the hinge section also rotatably connected to a central portion of the hinged section of the base 214 by a hinge pin 215.

Figure 125:
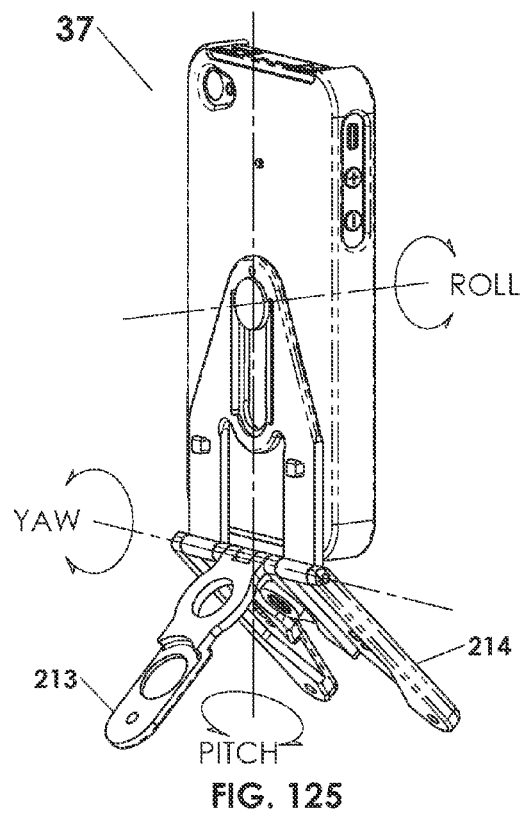
FIGS. 125-128 depict perspective views of the support assembly, case and PED of FIG. 122, with the support assembly deployed in a variety of fully opened and/or partially opened support configurations.
Figure 126:
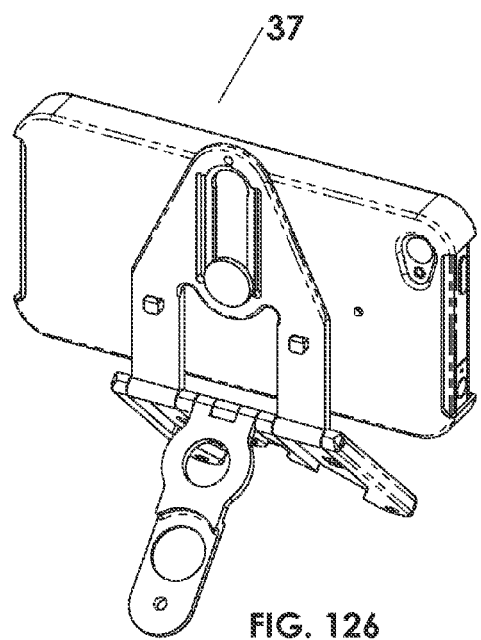
Figure 127:
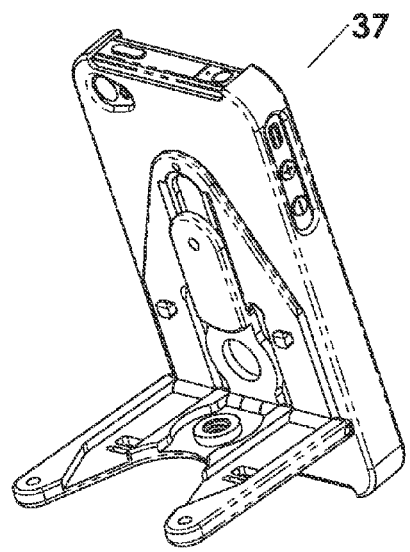
Figure 131:
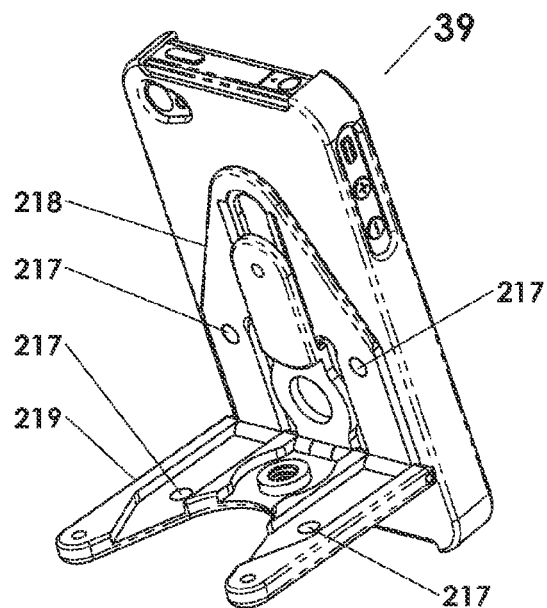
FIG. 131 is a perspective view of another alternative embodiment of a support assembly and PED, with the support assembly in a partially opened position showing small magnets or other engagement features used to secure the case in the closed position.
Figure 132:
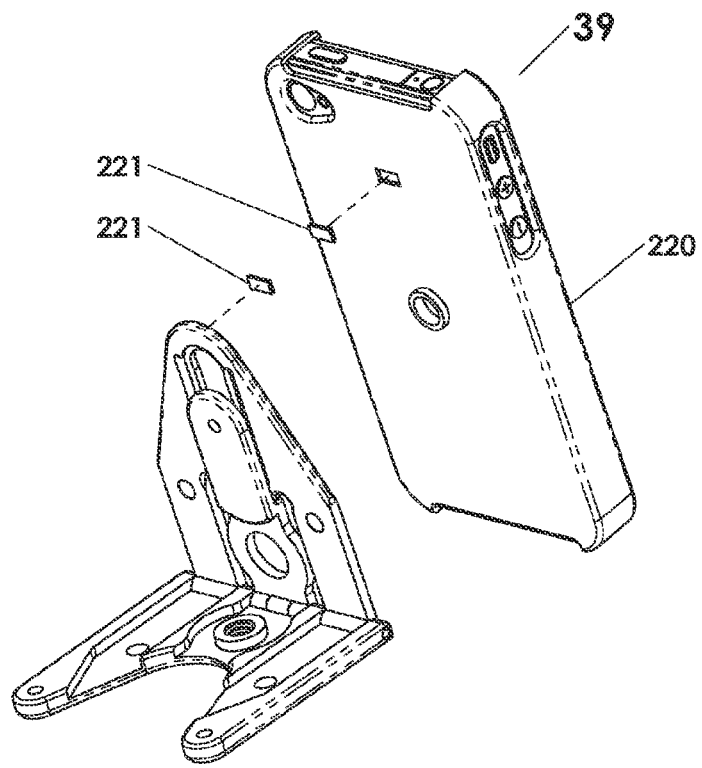
FIG. 132 is a partially exploded perspective of another alternative embodiment of a support assembly and PED, with the support assembly in a partially opened position showing small magnets or other engagement features for securing the case in a closed storage position.

As can be best seen from FIGS. 125 and 127, the base includes recessed sections for nesting the base with the leg and the sliding plate when the assembly is collapsed. In the collapsed condition, the sliding plate 211 includes clips 2116 (See FIG. 123) which extend through openings 214 in the base and engage with the base, thereby retaining the base in the closed and collapsed condition until deployment is desired by a user. Another way to retain the base in the secured position could be the use of small magnets 217 that are molded, pressed or bonded into place in the sliding plate 218 and base 219, such as shown in FIG. 131. In a similar manner, the case 210 could include a raised ridge or hump 2101, which can engage with a corresponding opening or depression 2113 in the sliding plate the plate is in a desired collapsed and/or closed position. An alternate way to retain the sliding plate 218 in the stored mated position with case 220 could be by the use of small magnets 221 that are molded, pressed or bonded into place in sliding plate 218 and case 220, such as shown in FIG. 132.

The base 214 desirably includes a bifurcated support leg 2141, which allows for increased strength and stability while reducing the number and complexity of components. The bifurcated base 214 and adjustable leg 213 allow the support assembly to remain stable on surfaces having a wide variety of textures and alignments. Moreover, the nested and locking features of the assembly significantly reduces the opportunity for unintended and inadvertent deployment of the assembly by the user.

Figure 128:
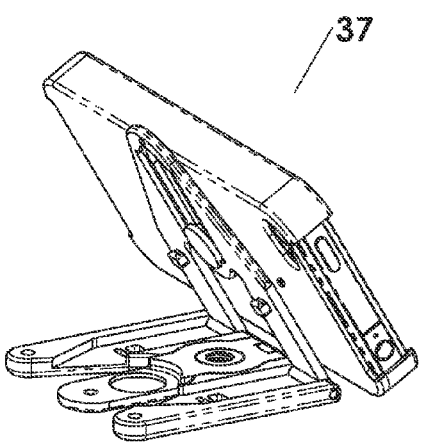
Figure 129:
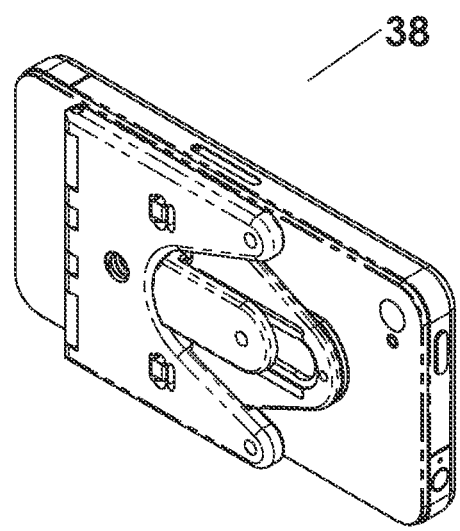
FIG. 129 is a perspective view of another alternative embodiment of a support assembly and PED, with the support assembly in the fully closed, retracted or "nested" configuration and attached directly to a surface of the PED.

As shown in FIGS. 125 through 128, this embodiment can assume a wide variety of positions and configurations to support the PED and/or PED case in a wide variety of orientations (i.e., the PED is "spherically" adjustable using the support assembly). For example, FIG. 125 depicts a PED having an integrated camera that can be oriented to virtually any position desired by the user, with rotation of the camera about a lateral PED axis being accomplished by rotating the PED and attached support assembly (modifying the "pitch"), rotation of the camera about a vertical PED axis being accomplished by rotating the sliding plate relative to the base and leg (modifying the "yaw"), and with rotation of the camera about a longitudinal axis being accomplished by rotating the sliding plate relative to the case (modifying the "roll"), allowing the attached camera to be oriented for landscape (FIG. 125) or portrait orientations (FIG. 126), as desired by the user. The ability of this embodiment to adjust the PED to almost any orientation can rival the adjustability of a professional tripod or other support structure, without the attendant complexity, price and/or bulkiness. Moreover, the design allows complete collapsing and nesting of the support structure, as shown in FIG. 129, allowing the assembly to remain immediately accessibly and permanently mounted to the PED and/or PED case yet not interfere with the normal operation of the PED. FIGS. 128 and 127 depict additional deployment methods of use for the support assembly, which may have particular utility for reading text and/or watching video on a screen of the PED.

Figure 130:
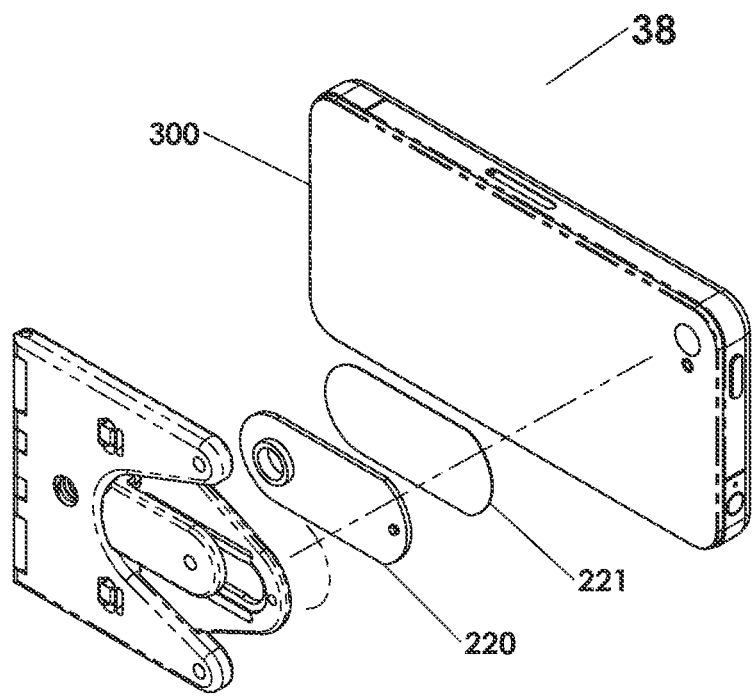
FIG. 130 is a partially exploded view of the support assembly and PED of FIG. 129.

FIG. 130 depicts an alternative embodiment of the support assembly of FIGS. 122 through 129, with the addition of a fixed plate 220 and adhesive material 221 for attaching the assembly 38 to a case or directly to a surface of the PED. The various other features of the assembly 38 are substantially similar to those of the previously described embodiment.

Figure 133:
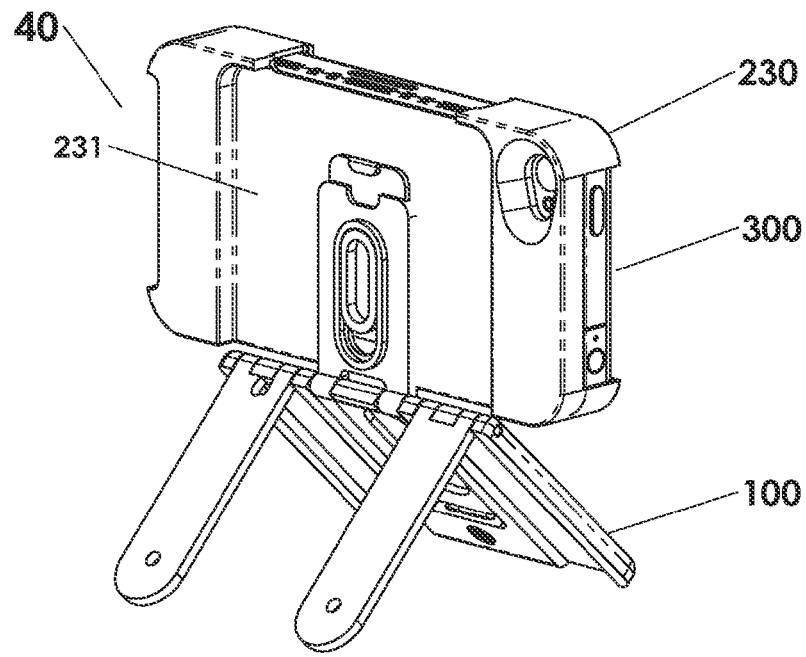
FIG. 133 depicts a perspective view of another alternative embodiment of a support assembly, case and PED, where the case includes a cavity or other recess that can fully or partially nest the support assembly.
Figure 134:
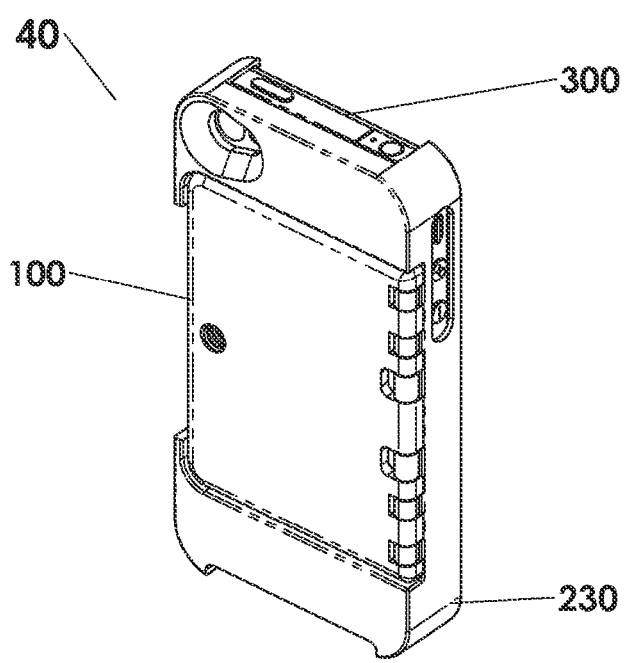
FIG. 134 depicts a perspective view of the support assembly, case and PED of FIG. 133, with the support assembly in the closed configuration.

FIGS. 133 and 134 depict one alternative embodiment of a case and support assembly 40 where the case 230 includes an increased wall thickness (when compared to various embodiments previously described) and a central recessed section or "nest" 231 into which the support assembly 10 can be collapsed and stored when not being used. In this embodiment, the collapsed support assembly can be fully accommodated by the recessed section 231, which in other alternative embodiments, the collapsed support assembly may only be partially accommodated by the section 231.

The various components described herein can be formed from a wide variety of materials, including metals, composites, plastics and/or wood. Where the PED includes the ability to transmit and/or receive wireless information, it may be desirous that any case and/or stand/assembly comprise non-conductive and/or non-magnetic materials. In one exemplary embodiment the various case and stand components can comprise plastic materials, desirably using a high-strength injection-moldable plastic or polymer material. Such materials can exhibit high-strength and/or durability with minimal or reduced wall thickness design, which desirably prevents the legs and/or other components from damage, breakage, and/or any other type of failure. Where flexion and/or flexibility of components is desired, the component material might include a flexible material such as polyethylene, silicone and/or rubber. Alternatively, where durability is desired, metallic and/or coated components may be utilized.

What is claimed is:

1. A collapsible stand assembly for supporting a portable computing electronic device at a desired orientation, comprising a first member connected to the device via a rotatable coupling, the first member moveable from a first collapsed position where the first member is substantially parallel to an external surface of the device to a second deployed position where at least a portion of the first member is spaced apart from the external surface of the device;

a first leg rotatably connected to the first member, the first leg moveable from a first leg collapsed position where the first leg is at least partially positioned within a first recess formed in the first member to a first leg deployed condition where a portion of the first leg is rotated to a position that is spaced apart from the first member; and a second leg rotatably connected to the first leg, the second leg moveable from a second leg collapsed position where the second leg is substantially coplanar with the first leg to a second leg deployed position where a portion of the second leg is rotated to a position that is spaced apart from the first leg, wherein the first member further includes at least a portion of a releasable securing mechanism for securing the first leg in the first leg collapsed position and the second leg is sandwiched between the first leg and the first member when the first leg is in the first leg collapsed position.

2. The collapsible stand assembly of claim 1, wherein the first recess extends completely through the first member.

3. The collapsible stand assembly of claim 1, wherein the first member is connected to the device by a sliding connection.

4. The collapsible stand assembly of claim 3, wherein the sliding connection and the rotatable coupling are a single coupling.

5. The collapsible stand assembly of claim 1, wherein the first member is directly connected to an exterior surface of the device.

6. The collapsible stand assembly of claim 1, wherein the first member is connected to a removable case on the device.

7. The collapsible stand assembly of claim 1, wherein at least a portion of the first leg is directly in contact with an external surface of the device when the first leg is in the first leg collapsed position.

8. The collapsible stand assembly of claim 1, wherein at least a portion of the second leg is directly in contact with an external surface of the device when the second leg is in the second leg collapsed position.

9. The collapsible stand assembly of claim 1, wherein at least one member of the group consisting of the first member, the first leg and the second leg includes a suction cup attachment.

10. A collapsible stand assembly for supporting a portable computing electronic device at a desired orientation, comprising a first member connected to the device via a rotatable coupling and a sliding coupling, the first member moveable from a first collapsed position where the first member is substantially parallel to an external surface of the device to a second deployed position where least a portion of the first member is spaced apart from the external surface of the device;

a first leg rotatably connected to the first member, the first leg moveable from a first leg collapsed position where the first leg is at least partially positioned within a recess formed in the first member to a first leg deployed condition where a portion of the first leg is rotated to a position that is spaced apart from the first member; and a second leg rotatably connected to the first leg, the second leg moveable from a second leg collapsed position where the second leg is substantially coplanar with the first leg to a second leg deployed position where a portion of the second leg is rotated to a position that is spaced apart from the first leg, wherein the second leg is sandwiched between the first leg and the first member when the first leg is in the first leg collapsed position.

11. The collapsible stand assembly of claim 10, wherein the recess formed in the first member faces away from the external surface of the device when the first leg is in the first leg collapsed position.

12. The collapsible stand assembly of claim 10, wherein the rotatable coupling and the sliding coupling are a single coupling.

13. The collapsible stand assembly of claim 10, wherein the first member is directly connected to an exterior surface of the device.

14. The collapsible stand assembly of claim 10, wherein the first member is connected to a removable case on the device.

15. The collapsible stand assembly of claim 10, wherein at least a portion of the first leg is directly in contact with an external surface of the device when the first leg is in the first leg collapsed position.

16. The collapsible stand assembly of claim 10, wherein a suction cup assembly is attached to at least one member of the group consisting of the first member, the first leg and the second leg.

* * * * *